United States Patent
McClay et al.

(10) Patent No.: US 9,699,448 B2
(45) Date of Patent: **\*Jul. 4, 2017**

(54) TESTING APPARATUS AND METHOD

(71) Applicant: Regenersis (Glenrothes) Ltd, London (GB)

(72) Inventors: Paul McClay, Fife (GB); Cameron Radford, Fife (GB); Stephen Devine, Fife (GB)

(73) Assignee: REGENERSIS (GLENROTHES) LTD., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,249

(22) Filed: Dec. 30, 2014

(65) Prior Publication Data

US 2015/0124104 A1    May 7, 2015

Related U.S. Application Data

(63) Continuation of application No. 13/513,911, filed as application No. PCT/GB2010/002243 on Dec. 7, 2010.

(Continued)

(30) Foreign Application Priority Data

Dec. 7, 2009  (GB) .................................. 0921402.4

(51) Int. Cl.
*H04N 7/173* (2011.01)
*H04N 17/00* (2006.01)
(Continued)

(52) U.S. Cl.
CPC ......... *H04N 17/045* (2013.01); *H04N 17/004* (2013.01); *H04N 17/02* (2013.01); *H04N 17/04* (2013.01)

(58) Field of Classification Search
None
See application file for complete search history.

(56) References Cited

U.S. PATENT DOCUMENTS

| 2,931,856 A | * | 4/1960 | Davis | ..................... H04N 17/04 |
| | | | | 348/179 |
| 4,758,877 A | * | 7/1988 | Slavin | .................. H04N 17/045 |
| | | | | 348/182 |

(Continued)

FOREIGN PATENT DOCUMENTS

| EP | 0789497 | 8/1997 |
| EP | 1624705 | 2/2006 |

(Continued)

OTHER PUBLICATIONS

For Dummies, "How to Move Your PC", Dec. 29, 2008, [online] [retrieved on Jun. 30, 2014]. Retrieved from the Internet: < http://www.dummies.com/hot-to/content/how-to-move-your-pc.html>.

(Continued)

*Primary Examiner* — William J Kim
(74) *Attorney, Agent, or Firm* — Snell & Wilmer L.L.P.

(57) ABSTRACT

A test apparatus for testing a video processing apparatus comprises means for receiving from the video processing apparatus a video output representative of a test sequence, the test sequence comprising a plurality of frames, each frame comprising an image of a respective different one of a plurality of frame identifiers; means for obtaining a sequence of sets of frame data from the video output, each set of frame data representative of a frame; and means for processing each set of frame data to determine the frame identifier for that frame.

18 Claims, 17 Drawing Sheets

Related U.S. Application Data

(60) Provisional application No. 61/267,298, filed on Dec. 7, 2009.

(51) Int. Cl.
*H04N 17/02* (2006.01)
*H04N 17/04* (2006.01)

(56) References Cited

U.S. PATENT DOCUMENTS

| | | | |
|---|---|---|---|
| 4,893,925 A | | 1/1990 | Sweeney et al. |
| 5,351,201 A | * | 9/1994 | Harshbarger, Jr. .... H04N 17/02 348/187 |
| 5,455,620 A | * | 10/1995 | Stevens .................. H04N 17/02 348/182 |
| 6,003,068 A | | 12/1999 | Sopko |
| 2006/0026481 A1 | | 2/2006 | Monnerat |
| 2006/0230312 A1 | | 10/2006 | Nichols et al. |
| 2007/0033446 A1 | | 2/2007 | Tinkler et al. |
| 2008/0137968 A1 | | 6/2008 | Joung et al. |
| 2010/0053337 A1 | * | 3/2010 | Kirk ..................... H04N 17/045 348/181 |

FOREIGN PATENT DOCUMENTS

| | | |
|---|---|---|
| EP | 2239952 | 10/2010 |
| GB | 2433666 | 6/2007 |
| WO | 2006024698 | 3/2006 |

OTHER PUBLICATIONS

Teach ICT, "What is a server", Jun. 28, 2007, [online] [retrieved on Jun. 30, 2014]. Retrieved from the Internet: < http://teach-ict.com/technology_explained/server.html >.

EP Search Report for EP13152905 dated Apr. 11, 2013.

International Search Report and Written Opinion for PCT/GB2010/002243 dated Jun. 7, 2011.

Notice of Allowance dated Sep. 30, 2014, U.S. Appl. No. 13/513,911.

Office Action dated Jan. 31, 2014, U.S. Appl. No. 13/513,911.
Final Office Action dated Jul. 9, 2014, U.S. Appl. No. 13/513,911.

* cited by examiner

TESTING APPARATUS AND METHOD

CROSS-REFERENCE TO RELATED APPLICATIONS

This application is a continuation of, claims priority to and the benefit of, U.S. Ser. No. 13/513,911 filed Oct. 26, 2012 and entitled "TESTING APPARATUS AND METHOD, which application is a U.S. National Stage filing under 35 U.S.C. §371 of PCT/GB2010/002243 filed Dec. 7, 2010, which application claims the benefit of provisional application Ser. No. 61/267,298 filed Dec. 7, 2009 and claims priority to Great Britain Application No. 0921402.4 filed Dec. 7, 2009 all of which are incorporated herein by reference in their entirety.

FIELD OF THE INVENTION

The present invention relates to a testing apparatus and method for testing apparatus such as audio/visual devices, for example set top boxes.

BACKGROUND TO THE INVENTION

Television and other audio/visual entertainment or information services are now provided to users via a variety of routes, for example via cable, telephone line satellite or over-air broadcast. Set top boxes are generally used to receive and process signals and to provide outputs to cause a television set to display a selected stream of content.

As the number of television channels and other services have increased, set top boxes have become increasingly more sophisticated and provide a range of functions to the user. In many cases a set top box is provided to a user as part of a subscription package provided by a service provider. Often the service provider retains ownership of the set top box and is responsible for maintenance and replacement of the set top box in the event of faults.

In the case of faults in a set top box reported by a user, a service provider usually sends an operative to the user's home to inspect the set top box. Existing test systems are not suitable for testing set top boxes in situ, and in the event of a reported fault boxes are usually replaced rather than tested or serviced at the user's home. The previous set top box is then sent to a central facility for testing. If the testing reveals that there is no fault, or if the fault is easy to rectify, the set top box can then be provided, as new, to another user, subject to replacement of outer casing if necessary.

When a user terminates a subscription package, the set top box provided as part of the package is also sent to the central test facility, and if testing reveals no faults it is again provided, as new, to another user. If testing reveals faults then either the faults are rectified or the set top box is discarded.

In the UK, more than a million used set top boxes are tested each year, disregarding any testing that may take place as part of the manufacturing process. In the US, there are many more set top boxes per head than in the UK and the numbers of set top boxes tested are greater. In Texas alone, for example, more than 20 million used set top boxes are tested each year.

The testing of set top boxes is a major expense for service providers or set top box manufacturers, and any increase in the speed of testing can produce significant cost savings. It is also important that testing is accurate, as any inaccuracies in testing can result in faulty set top boxes being returned to users. For service providers in particular it is very important that the fault levels of set top boxes do not become too high, as that can have a significant impact on the level of user satisfaction.

In a known set top box testing facility, conveyor belts are used to transfer set top boxes to and from testing stations. Each testing station comprises a rack including a PC running test software, a mounting point for mounting a set top box to be tested, a screen for connection to the set top box for outputting video content provided via the set top box, and a network connection for connecting the set top box to a head end server within the site.

Upon receipt of a set top box from the conveyor belt, an operator mounts the set top box on the testing station, and connects it to the screen, the network and other components needed for testing. A test program running on the PC instructs the operator to perform a sequence of tests and the user can log the results of the tests using the testing program. The tests can include checking that the set top box powers up and initialises correctly, checking that the buttons on the front of the set top box work correctly, and checking that the set top box received infra-red remote control signals correctly, usually by operating each of the buttons on a remote control unit in turn and checking for the correct response.

In addition to the testing of the basic operation of the set top box, the operator also tests the quality of the video and audio output by the set top box. The head end server provides audio/visual content to the set top box and the operator views the video content on the screen connected to the set top box, and listens to the audio content, usually via headphones. The operator provides a subjective assessment of whether he considers the video and audio output to be of acceptable quality. The operator is trained to assess the audio/visual content in comparison with pre-determined criteria. The criteria and the content to be used for testing is usually selected by the service provider or set top box manufacturer.

Most of the tests are performed manually by the operator or rely on operator judgement, and thus are subjective. For example, the testing of audio/visual content in known systems is subjective and outcomes can vary from operator to operator and over time (for example, in dependence on the level of attentiveness of the operator on different days or different times of day). Furthermore, as an operator becomes more familiar with a test over weeks or months their assessment of what is or is not acceptable set top box performance can change, and the assessments of different operators can begin to diverge. In addition, each time a new product is to be tested or a new test is to be introduced operators must be retrained.

Furthermore, certain faults in the reproduction of audio/visual content can be harder or easier to spot depending on the type of content being displayed. For example, missing or frozen frames may more apparent when viewing, for example, sporting events than when viewing test patterns. Some faults may not be apparent when viewing content at normal speed in a test procedure but may be clear to a user when replaying recorded content, for example in slow motion.

It is an aim of the present invention to provide an improved or at least alternative testing apparatus or method.

SUMMARY OF THE INVENTION

In a first, independent aspect of the invention there is provided a test apparatus comprising:—means for receiving from the video processing apparatus a video output representative of a test sequence, the test sequence comprising a plurality of frames, each frame comprising an image of a respective different one of a plurality of frame identifiers; means for obtaining a sequence of sets of frame data from the video output, each set of frame data representative of a frame; means for processing each set of frame data to determine the frame identifier for that frame. The video processing apparatus may comprise a set top box.

Thus, an automatic, objective test for determining whether a set top box or other apparatus is processing each frame correctly can be provided.

It has been found that set top boxes or other apparatus can occasionally process incorrectly frames in a sequence of frames and, for example, frames can be skipped in the video output from the set top box or other apparatus. That can produce freeze frame errors or other errors in the sequence of images displayed to a user. Such frame errors can be difficult or impossible to detect by visual inspection of a display by an operator in a test environment, but may be detectable by a user in normal use depending for example on the content being viewed by the user and operations performed by the user (for example, viewing in slow motion or frame-by-frame pausing and viewing). By providing a different frame identifier in each frame, and detecting the frame identifiers, frame processing errors may be detected.

The video output may be for causing display of the test sequence on a screen or other display.

The apparatus may further comprise means for providing a video input signal to a video processing apparatus, wherein the video input signal comprises the test sequence.

The processing may comprise performing, for each set of frame data, an optical character recognition (OCR) procedure The apparatus may further comprise means for comparing determined frame identifiers for different frames, for example successive frames in the sequence.

Thus, it can be determined if any frames have been skipped in the sequence of frames.

The apparatus may further comprise means for storing the frame identifiers for the frames in the test sequence, and means for comparing the determined frame identifiers for the sequence of frames to the stored frame identifiers.

The apparatus may further comprise means for determining whether the video output represents the sequence of frames correctly in dependence on the or each comparison.

The frame identifiers may comprise a predetermined sequence of identifiers, each in the sequence of identifiers being included in a respective, different frame. The frame identifiers may comprise a sequence of numbers or letters.

The image of the frame identifier for each frame may be located in a predetermined identifier region of the frame. By providing the frame identifiers in a predetermined identifier region of the frame, performance of an OCR or other identifier detection procedure on the video data for the whole frame may be avoided, which can provide for a more efficient and quicker procedure.

The apparatus may further comprise means for processing the video output to obtain a plurality of display signals from the video output, each display signal representative of the video output for a respective location, wherein the processing means is configured to select those display signals representative of the video output at locations in the identifier region of the frame, and the processing means may be configured to perform determine the identifier from the selected display signals. The display signals may be pixel signals. The locations may be locations on the screen or other display.

The processing means may be configured to process display signals for each of a plurality of locations in the identifier region, to determine a respective value of a parameter representative of the display signal for each location, and determine the frame identifier from the plurality of parameter values.

The processing means may configured to assign one of a plurality of values to each location, depending on the display signal. The value may be assigned in dependence on the colour and/or brightness of the display signal at each location. The plurality of values may be two values, for example 1 or 0. For example, for each location whether the display signal represents the colour black or white may be represented by a 1 or 0.

The plurality of locations may be arranged in a grid arrangement. The grid may be a regular grid, for example a square or rectangular grid Each identifier may comprise a plurality of characters of a character set, for example a plurality of numerals. The processing means may be configured to determine each character of the identifier individually.

Each character may be provided at a predetermined area within the identifier region. The processing means may be configured to process display signals for each of the predetermined areas separately to determine each character separately.

Each character may be in a digitised font. All pixels of the identifier region within a character may be of a single predetermined colour and/or brightness. All pixels of the identifier region outside a character may be of single, different predetermined colour and/or brightness.

Each frame may comprise at least one alignment mark located at a predetermined position with respect to the identifier region. Thus, the apparatus may be able to determine the location of the identifier region in dependence on the location of the alignment mark. That can be particularly important as known set top boxes can experience faults in which frames output by the set top box are shifted in location with respect to a display. Thus, particular regions, for example the identifier region, may not be found in the expected location. The use of alignment marks can enable the correct identification of the identifier region even in the presence of such errors.

The processing means may be configured to process the video output, for each frame, to determine the location of the at least one alignment mark for the frame and to determine the location of the identifier region from the determined location of the at least one alignment mark.

The processing means may be configured to determine the location of the at least one alignment mark using an OCR procedure.

Each identifier region may comprise a relatively plain background and/or a background that contrasts with the or each identifier.

The means for determining the frame identifiers may form part of a testing means for performing a test on a series of sets of the frame data in turn, and the testing means may be configured to test at least one set of frame data in the series before completion of the receiving and/or processing of the video output to obtain further sets of frame data representative of later frames in the series.

That feature is particularly important and so in a further independent aspect of the invention there is provided a test apparatus for testing a video processing apparatus, the video processing apparatus being configured to receive a video input signal comprising a sequence of frames, process the video input signal and stream a video output representative of the sequence of frames, wherein the apparatus comprises:—means for obtaining sets of frame data from the video output, each set of frame data representative of a frame; and testing means for receiving and performing a test on a series of sets of the frame data in turn, wherein the testing means is configured to operate so that at least one set of frame data in the series is tested before receiving further sets of frame data representative of later frames in the series. The video processing apparatus may comprise a set top box.

Thus, automatic testing of parts of the video output can proceed whilst the set top box or other video apparatus is continuing to output subsequent parts of the video output. Thus, the test apparatus does not have to wait to capture an entire sequence before beginning testing of the sequence. That can provide a significant time saving, which can be particularly important in the context of a test facility where the time taken for each test is commercially important and any time savings, even of seconds, to complete each test can be critical.

Each set of frame data in the series may be tested during processing of the video output to obtain further sets of frame data representative of later frames in the sequence.

The testing means may be configured to repeatedly determine whether the set top box has passed or failed, each such determination being performed in response to the testing of a set of frame data, or a plurality of sets of frame data, in the series of sets of frame data.

Thus, if the set top box will fail the test due to errors in a set of frame data, the apparatus may not have to process and test later sets of frame data before determining that the set top box has failed. That can provide a significant time saving.

The testing means may be configured to determine that the set top box has failed in response to a set of frame data or a predetermined number of sets of frame data failing the test.

The apparatus may further comprise a frame buffer for buffering the sequence of sets of frame data, and the testing of a set of frame data may comprise reading the set of frame data from the buffer and testing the set of frame data. Thus, testing can occur in real time or close to real time. The frame buffer may be arranged to operate so that later frame data in the sequence overwrites earlier frame data in the sequence. The frame buffer may operate on a first-in-first-out (FIFO) basis.

The apparatus may further comprise storage means for storing the sets of frame data, and the testing means may be configured to store each set of frame data after testing the set of frame data.

The video input signal may comprise a test sequence comprising a plurality of frames. The apparatus may comprise means for streaming the video input signal to the set top box.

The or each video input signal may be representative of a test pattern comprising a plurality of colour bars, and the apparatus may further comprise:—means for receiving from the video processing apparatus a video output for causing display of the test pattern on a screen, and obtaining a plurality of display signals from the video output, each display signal representative of the video output for a respective location on the screen; means for selecting a plurality of display signals for each colour bar, the plurality of display signals for a colour bar representative of the video output at locations within a predetermined region of that colour bar; means for processing the selected display signals for each colour bar to determine whether the video output represents the colour bar correctly.

That feature is particularly important, and so in a further independent aspect of the invention there is provided a test apparatus comprising:—means for receiving from the video processing apparatus a video output representative of a test pattern, the test pattern comprising a plurality of colour bars; means for obtaining a plurality of display signals from the video output, each display signal representative of the video output for a respective location; means for selecting a plurality of display signals for each colour bar, the plurality of display signals for a colour bar representative of the video output at locations within a predetermined region of that colour bar; and means for processing the selected display signals for each colour bar to determine whether the video output represents the colour bar correctly. The video processing apparatus may comprise a set top box.

Thus, an automated, objective technique for assessing whether a set top box or other apparatus is processing video input signals to enable correct display of colours on a screen may be provided.

The video output may be for causing display of the test pattern on a screen or other display. Each location may be a location on the screen or other display.

The apparatus may comprise means for providing an output signal representative of the determination of whether the video output represents the colour bar correctly.

The display signals may comprise pixel signals. The video input signal may comprise a digital signal. The video output may comprise an analogue signal, and in that case the obtaining a plurality of display signals from the video output may comprise sampling and/or performing an analogue/digital conversion on the video output.

By selecting a plurality of display signals falling within a region of interest of the colour bar, parts of the colour bar where distortion of the signal may be expected in normal operation can be excluded, therefore providing a more accurate assessment of whether the set top box is operating normally or not.

The region of interest may span a plurality of horizontal display lines.

The region of interest may extend for a plurality of pixels in both the horizontal and vertical display directions. The region of interest for each colour bar may be a two-dimensional region, for example a rectangular region.

A fault that can be found in set top boxes, more usually set top boxes providing analogue outputs, is that they display the colour one or more individual horizontal lines incorrectly whilst displaying the colour of other horizontal lines correctly. For example, a set top box video output may represent one or more horizontal lines as white lines. By providing that the predetermined region spans a plurality of horizontal lines, the apparatus can detect the presence of faults due to such white lines. In contrast, visual inspection of a screen display by an operator can often miss such white line faults.

The region of interest for each colour bar may exclude a border region of that colour bar.8

It has been found that set top boxes or other video processing apparatus in normal operation can provide at least some distortion of the colour represented by the video output at areas close to borders between different colour bars. By suitable selection of the region of interest of the colour bar, such areas of the colour bar can be excluded from the testing. Thus, regions where distortion of the colour of the video output may occur in normal operation may be excluded.

The or each excluded border region may have a width of at least 2 pixels, and/or at least 5 pixels, and/or at least 15 pixels.

The selecting means may be configured to select the region of interest for each colour bar, for example in dependence upon at least one property of the video input signal or the video output.

The at least one property of the video input signal or the video output may comprise a resolution and/or a format.

The test pattern may comprise a marker, for example representative of or positioned at a predetermined location on the test pattern. The marker may for example comprise a line. The apparatus may comprise means for determining the location of the marker and determining the location of the colour bars and/or the regions of interest in dependence on the determined location of the marker.

The region of interest of each colour bar may comprise at least 80% of the area of the colour bar, optionally at least 60% of the area of the colour bar.

The processing of the selected display signals may comprise determining at least one numerical value representative of the colour at each location, for example determining R, G and B values for each location. That can provide for a particularly straightforward way of determining whether the video output represents each colour bar correctly.

The processing may comprise averaging the numerical values and comparing the average to an expected value for the colour of the colour bar, and determining that the video output does not represent the colour bar correctly if the average value is different from the expected value by greater than a threshold amount.

The processing may comprise determining a spread of the numerical values and comparing the spread to a threshold value. The processing may comprise determining that the video output does not represent the colour bar correctly if the determined spread is greater than the threshold value.

The processing means may be configured to select a threshold value or values for acceptable performance, for example in dependence on at least one property of the video input signal or video output or video processing apparatus. The at least one property may comprise a type, resolution or format.

The processing may comprise determining whether the numerical values for any of the locations differ from a or the expected value by greater than a threshold amount.

The processing may comprise determining that the video output does not represent the colour bar correctly if the numerical values for any of the locations differ from a or the expected value by greater than a threshold amount, or if the numerical values for greater than a predetermined number of the locations differ from a or the expected value by greater than a threshold amount.

In another independent aspect there is provided a test apparatus for testing a remotely-controllable device, the remotely-controllable device comprising an infra-red detector for detecting infra-red signals from a remote control unit, wherein the test apparatus comprises:—an infra-red test device for outputting an infra-red test signal to the infra-red detector; and control means for controlling the magnitude of the infra-red test signal to be substantially less than the magnitude of an infra-red signal output from a remote control unit in normal operation. The remotely-controllable device may comprise a set top box.

Thus, the infra-red test device can be positioned closer than would be expected during normal operation of a set top box or other device and remote control unit, for example by a user in a home environment, whilst providing for a test that is representative of the such normal operation. That can be particularly important when the test apparatus is for use in a test facility where space may be limited and it may be difficult for an operator to stand at a distance from the set top box that is similar to the distance a user would usually be positioned from the step box in normal operation of the remote control unit.

The magnitude of the infra-red signal output from the remote control unit in normal operation may be the infra-red signal at full power, for example at full battery power, or the infra-red signal obtained at a threshold minimum acceptable power of the remote control unit.

By providing that the magnitude of the signal is at a level similar to that expected in normal use, it may be possible to ensure that the testing provides a realistic assessment under conditions similar to those experienced by a user in a home or other environment.

The control means may be configured to control the magnitude of the infra-red signal to be substantially equal to the magnitude of the signal obtained from a remote control unit at a pre-determined distance from the remote control unit in normal operation. The pre-determined distance may be between 2 m and 5 m. The distance may be similar to the distance of a remote control unit from a set top box in normal use in a user's home.

The control means may be configured to control the magnitude of the infra-red signal to have each of a plurality of magnitudes in succession.

The plurality of magnitudes may correspond to the magnitudes of infra-red signal provided by the remote control unit for different levels of battery power of the remote control unit.

The plurality of magnitudes may comprise a magnitude corresponding to the magnitude of infra-red signal provided by the remote control unit at full battery power, and/or a magnitude corresponding to a minimum acceptable level of battery power provided by the remote control unit.

The plurality of magnitudes may comprise magnitudes of infra-red signal expected to be provided by the remote control unit (for example at normal or full battery power) at a plurality of different distances. The different distances may be distances within the range 0.5 m to 10 m, for example.

The infra-red test device and control means may be configured to operate to emulate operation of the remote control unit. For example the infra-red test device and control means may be configured to operate so that at least one infra-red signal output by the infra-red test device is substantially the same or similar in form to at least one infra-red signal output by the remote control unit in operation.

In another independent aspect of the invention there is provided a test apparatus for testing a remotely-controllable device, the remotely-controllable device comprising an infra-red detector for detecting infra-red signals from a remote control unit, wherein the test apparatus comprises:—an infra-red test device for outputting an infra-red test signal to the infra-red detector; wherein the infra-red test device and control means are configured to operate to emulate operation of a remote control unit.

The apparatus may further comprise mounting means for mounting the infra-red test device on the apparatus, and the mounting means may be configured and/or operable to substantially align the infra-red test device with the infra-red detector of a remotely-controllable device and/or to locate the infra-red test device at a desired distance from the infra-red detector of the remotely-controllable device, when remotely-controllable device is at a predetermined position on the apparatus.

The apparatus may be arranged to receive the remotely-controllable device at a predetermined position on the apparatus.

The mounting means may comprise a moveable member, that is moveable to align the infra-red test device with the infra-red detector and to locate the infra-red test device at the desired distance from the infra-red detector.

The desired distance from the infra-red detector may be, for example, less than 10 cm, less than 5 cm or less than 2 cm.

The mounting means may be configured to locate the infra-red test device adjacent to the infra-red detector. Thus, the testing of the set top box may require a reduced amount of space. That can be particularly important when the testing is taking place in a test facility, where available space may be limited.

The mounting means may comprise at least one of a flexible stem, a pivotable arm, or a mouse.

The apparatus may further comprise a device mounting means for mounting the remotely-controllable device on the test apparatus at the predetermined position.

The apparatus may further comprise means for monitoring the response of the remotely-controllable device to the or each infra-red signal.

The monitoring means may be configured, in operation, to determine whether the remotely-controllable device has passed or failed in dependence on the or each response, or on a plurality of the responses.

The control means may be operable to apply the infra-red test signals as part of an automated test sequence.

In another independent aspect of the invention, there is provided a test apparatus for testing a video processing apparatus, comprising:—control means operable to control an automated test procedure on a video processing apparatus, wherein the automated test procedure comprises applying a sequence of inputs to the video processing apparatus and monitoring outputs provided by the video processing apparatus in response to the inputs, and the apparatus further comprises:—means for providing at least one video input test signal to the video processing apparatus; means for receiving from the video processing apparatus at least one video output provided by the video processing apparatus in response to the at least one video input test signal; and means for determining the outcome of at least one test of the test sequence in dependence on the at least one video output. The video processing apparatus may comprise a set top box.

The test apparatus may be a portable apparatus, for example for transport to a user's premises for testing a set top box at the user's premises.

The test apparatus may comprise storage means for storing the at least one video input test signal. The apparatus may be arranged so that in operation the at least one video input test signal can be streamed to the set top box from the storage means, for example via a connector.

The test apparatus may comprise a portable server, for example a portable content server.

The test apparatus may comprise a housing for housing each of the components of the test apparatus and/or an integral display for viewing the at least one video output.

The housing may be a single housing for substantially all of the components of the test apparatus.

In another independent aspect of the invention there is provided a test apparatus for testing a video processing apparatus, the test apparatus comprising:—a receiver for receiving from the video processing apparatus a video output representative of a test sequence, the test sequence comprising a plurality of frames, each frame comprising an image of a respective different one of a plurality of frame identifiers; a processor operable to obtain a sequence of sets of frame data from the video output, each set of frame data representative of a frame, and to process each set of frame data to determine the frame identifier for that frame.

In another independent aspect of the invention there is provided a method of testing a video processing apparatus, comprising:—receiving from the video processing apparatus a video output representative of a test sequence, the test sequence comprising a plurality of frames, each frame comprising an image of a respective different one of a plurality of frame identifiers; obtaining a sequence of sets of frame data from the video output, each set of frame data representative of a frame; and processing each set of frame data to determine the frame identifier for that frame.

The method may comprise providing a video input signal to the video processing apparatus, and the video input signal may comprise the test sequence. The video processing apparatus may comprise a set top box.

The method may comprise comparing determined frame identifiers for different frames. The method may comprise storing frame identifiers of the test sequence, and comparing the determined frame identifiers for the sequence of frames to the stored frame identifiers. The method may comprise determining whether the video output represents the sequence of frames correctly in dependence on the or each comparison.

The image of the frame identifier for each frame may be located in an identifier region of the frame.

The method may comprise processing the video output to obtain a plurality of display signals from the video output, each display signal representative of the video output for a respective location on a display, and the method may further comprise selecting those display signals representative of the video output at locations in the identifier region of the frame, and determining the frame identifier from the selected display signals.

The method may comprise processing display signals for each of a plurality of locations in the identifier region, determining a respective value of a parameter representative of the display signal for each location, and determining the frame identifier from the plurality of parameter values.

The method may comprise assigning one of a plurality of values to each location, depending on the display signal.

The plurality of locations may be in a grid arrangement.

Each frame may comprise at least one alignment mark located at a predetermined position with respect to the identifier region.

The method may comprise processing the video output, for each frame, to determine the location of the at least one alignment mark for the frame and to determine the location of the identifier region from the determined location of the at least one alignment mark.

Each identifier region may comprise a substantially plain background and/or a background that contrasts with the or each identifier.

The method may comprise performing a test on a series of sets of the frame data in turn, and testing at least one set of frame data in the series before completion of the receiving and/or processing the video output to obtain further sets of frame data representative of later frames in the series.

In another independent aspect of the invention there is provided a method of testing a video processing apparatus comprising providing a test sequence to the video processing apparatus, the test sequence comprising a plurality of frames, each frame comprising a respective different one of a plurality of frame identifiers.

In another independent aspect of the invention there is provided a video signal comprising a test sequence comprising a plurality of frames, each frame comprising a respective different one of a plurality of frame identifiers In another independent aspect of the invention there is provided a test apparatus comprising means for storing a test sequence and means for transmitting the test sequence to a video processing apparatus, wherein the test sequence comprises a plurality of frames, each frame comprising a respective different one of a plurality of frame identifiers.

In another independent aspect of the invention there is provided a method of testing a video processing apparatus, the video processing apparatus being configured to receive a video input signal comprising a sequence of frames, process the video input signal and stream a video output representative of the sequence of frames on a screen, wherein the apparatus comprises:—a receiver for receiving the video output and obtaining sets of frame data from the video output, each set of frame data representative of a frame; and a processor for performing a test on a series of sets of the frame data in turn, wherein the processor is configured to operate so that at least one set of frame data in the series is tested before receiving further sets of frame data representative of later frames in the series.

The video processing apparatus may comprise a set top box. The method may comprise repeatedly determining whether the set top box has passed or failed, each such determination being performed in response to the testing of a set of frame data in the series of sets of frame data. The method may comprise determining that the set top box has failed in response to a set of frame data or a predetermined number of sets of frame data failing the test.

The method may comprise using a frame buffer to buffer the sequence of sets of frame data, and the testing of a set of frame data may comprise reading the set of frame data from the buffer and testing the set of frame data.

The method may comprise storing each set of frame data after testing the set of frame data.

The or each video input signal may be representative of a test pattern comprising a plurality of colour bars, and the method may further comprise:—receiving from the video processing apparatus a video output representative of the test pattern, and obtaining a plurality of display signals from the video output, each display signal representative of the video output for a respective location; selecting a plurality of display signals for each colour bar, the plurality of display signals for a colour bar representative of the video output at locations within a region of interest of that colour bar; processing the selected display signals for each colour bar to determine whether the video output represents the colour bar correctly.

In another independent aspect of the invention there is provided a method of testing a video processing apparatus comprising:—receiving from the video processing apparatus a video output representative of a test pattern, the test pattern comprising a plurality of colour bars; obtaining a plurality of display signals from the video output, each display signal representative of the video output for a respective location; selecting a plurality of display signals for each colour bar, the plurality of display signals for a colour bar representative of the video output at locations within a region of interest of that colour bar; processing the selected display signals for each colour bar to determine whether the video output represents the colour bar correctly.

The method may comprise providing a video input signal representative of the test pattern to the video processing apparatus. The video processing apparatus may comprise a set top box.

The region of interest may span a plurality of horizontal display lines. The region of interest may extend for a plurality of pixels in both horizontal and vertical display directions. The region of interest for each colour bar may exclude a border region of each colour bar.

The method may comprise selecting the region of interest for each colour bar, for example in dependence upon at least one property of the video input signal or the video output.

The region of interest of each colour bar may comprise at least 80% of the area of the colour bar, optionally at least 60% of the area of the colour bar.

The processing of the selected display signals may comprise determining at least one numerical value representative of the colour at each location, for example determining R, G and B values for each location.

The processing may comprise averaging the numerical values and comparing the average to an expected value for the colour of the colour bar, and determining that the video output does not represent the colour bar correctly if the average value is different from the expected value by greater than a threshold amount.

The processing may comprise determining whether the numerical values for any of the locations differ from a or the expected value by greater than a threshold amount.

In another independent aspect of the invention there is provided a test apparatus for testing a video processing apparatus comprising:—a receiver for receiving from the video processing apparatus a video output representative of a test pattern, the test pattern comprising a plurality of colour bars; a processor configured to obtain a plurality of display signals from the video output, each display signal representative of the video output for a respective location, to select a plurality of display signals for each colour bar, the plurality of display signals for a colour bar representative of the video output at locations within a region of interest of that colour bar, and to process the selected display signals for each colour bar to determine whether the video output represents the colour bar correctly.

In another independent aspect of the invention there is provided a method of testing a remotely-controllable device, the remotely-controllable device comprising an infra-red detector for detecting infra-red signals from a remote control unit, wherein the method comprises:—positioning an infra-red testing device at a test position relative to the remotely controllable device; outputting an infra-red test signal from the infra-red testing device to the infra-red detector; and controlling the magnitude of the infra-red test signal to be substantially less than the magnitude of an infra-red signal output from a remote control unit in normal operation.

The remotely-controllable device may comprise a set top box.

The magnitude of the infra-red signal output from the remote control unit in normal operation may be the infra-red signal at full power, for example at full battery power, or the infra-red signal obtained at a threshold minimum acceptable power of the remote control unit.

The method may comprise controlling the magnitude of the infra-red signal to be substantially equal to the magnitude of the signal obtained from a remote control unit at a pre-determined distance from the remote control unit in normal operation. The pre-determined distance may be between 2 m and 5 m.

The method may comprise controlling the magnitude of the infra-red signal to have each of a plurality of magnitudes in succession. The plurality of magnitudes may correspond to the magnitudes of infra-red signal provided by the remote control unit for different levels of battery power of the remote control unit. The plurality of magnitudes may comprise a magnitude corresponding to the magnitude of infra-red signal provided by the remote control unit at full battery power, and a magnitude corresponding to a minimum acceptable level of battery power provided by the remote control unit.

The infra-red test device may be configured to operate to emulate operation of the remote control unit.

The method may comprise mounting the infra-red test device on remotely controllable device. The method may comprise substantially aligning the infra-red test device with the infra-red detector of a remotely-controllable device and locating the infra-red test device at a desired distance from the infra-red detector of the remotely-controllable device.

The method may comprising mounting the infra-red test device using a mounting means comprising a moveable member, that is moveable to align the infra-red test device with the infra-red detector and/or to locate the infra-red test device at the desired distance from the infra-red detector. The mounting means may be configured to locate the infra-red test device adjacent to the infra-red detector. The mounting means may comprise at least one of a flexible stem, a pivotable arm, or a mouse.

The method may comprise monitoring the response of the remotely-controllable device to the or each infra-red signal. The method may comprise determining whether the remotely-controllable device has passed or failed in dependence on the or each response.

The method may comprise applying the infra-red test signals as part of an automated test sequence.

In another independent aspect of the invention there is provided a test apparatus for testing a remotely-controllable device, the remotely-controllable device comprising an infra-red detector for detecting infra-red signals from a remote control unit, wherein the test apparatus comprises:— an infra-red test device for outputting an infra-red test signal to the infra-red detector; and a controller for controlling the magnitude of the infra-red test signal to be substantially less than the magnitude of an infra-red signal output from a remote control unit in normal operation.

In another independent aspect of the invention there is provided a method of testing a video processing apparatus, comprising:—providing at least one video input test signal to the video processing apparatus; receiving from the video processing apparatus at least one video output provided by the video processing apparatus in response to the at least one video input test signal; processing the video output and automatically determining the outcome of at least one test of an automated test sequence in dependence on the at least one video output.

The video processing apparatus may comprise a set top box. The method may comprise testing the video processing apparatus using a portable test apparatus, the portable test apparatus being suitable for transport to a user's premises for testing a set top box at the user's premises.

The method may comprise wirelessly transmitting data representative of the results of the test procedure.

In another independent aspect of the invention there is provided a test apparatus for testing a video processing apparatus, comprising: a controller operable to control an automated test procedure on a video processing apparatus, wherein the automated test procedure comprises applying a sequence of inputs to the video processing apparatus and monitoring outputs provided by the video processing apparatus in response to the inputs, and the apparatus further comprises:—a server for providing at least one video input test signal to the video processing apparatus; a receiver for receiving from the video processing apparatus at least one video output provided by the video processing apparatus in response to the at least one video input test signal; and a processor for determining the outcome of at least one test of the test sequence in dependence on the at least one video output.

The test apparatus may be a portable test apparatus. The test apparatus may comprise a housing that houses substantially all of the components of the test apparatus.

In further independent aspect of the invention there is provided a computer program product comprising computer readable instructions that are executable (for example by a general purpose or dedicated computer) to perform any one of the methods as claimed or described herein, or any combination of those methods.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting example, and are illustrated in the following figures, in which:

FIG. 7a is an illustration of an identifier region included in the frame of test content of FIG. 4;

FIG. 7b is an illustration of an identifier numeral included in the identifier region of FIG. 7a;

Figure 1:
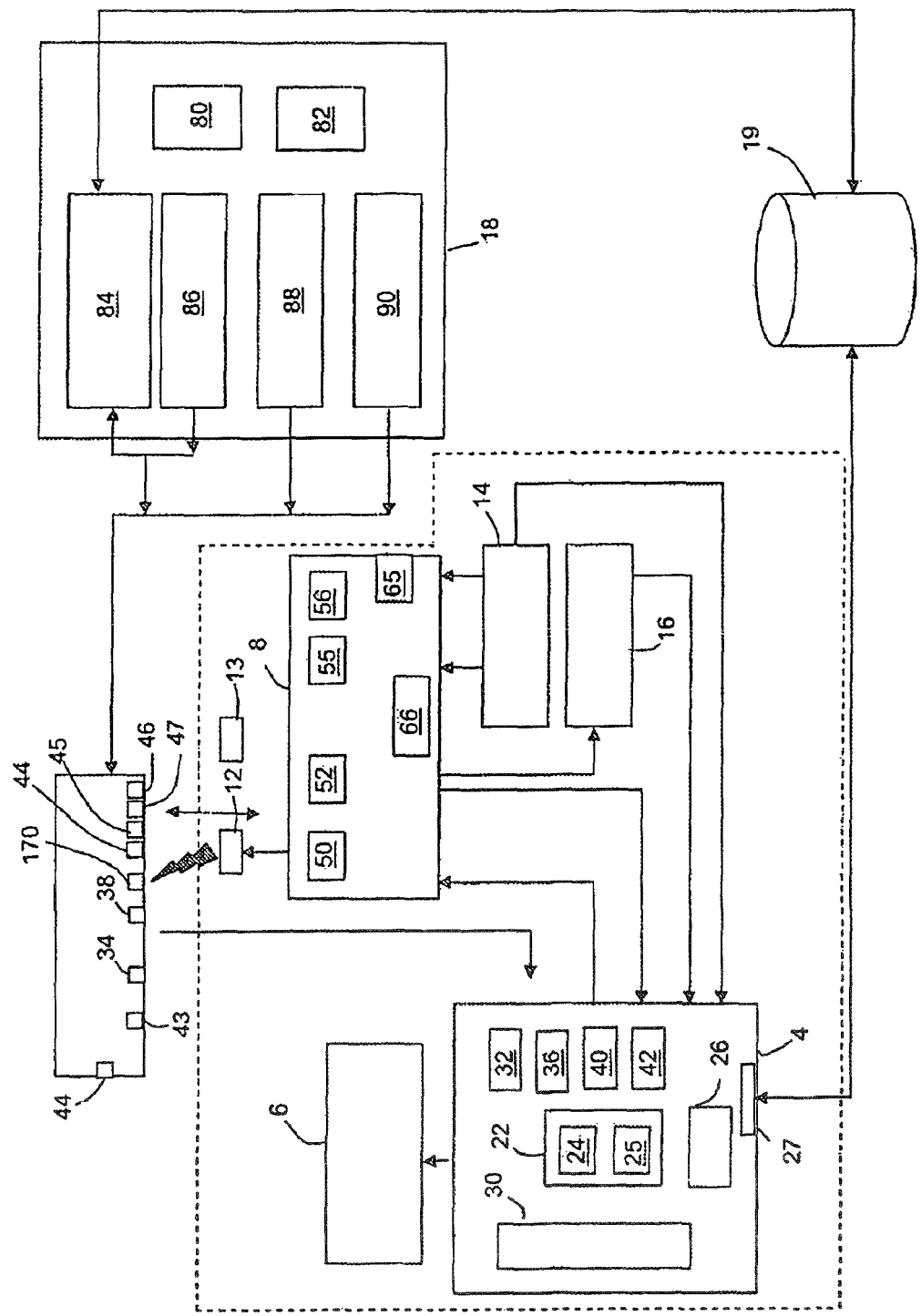
FIG. 1 is a schematic illustration of a set top box test system.

A set top box test system is illustrated in FIG. 1. The test system comprises a test PC or other computer 4 that includes dedicated test and control software, connected to a display screen 6 for display of an operator interface. The test PC 4 is connected to an interface unit 8 that in turn is connected to a set top box 10 under test. An infra-red emulator device 12 is connected to the interface unit 8 and can be aligned with an infra-red detector of the set top box. A magic eye device 13 (for example, a TVLink device) is also connected to the interface unit 8.

The system also includes a pattern generator unit 14 (for example comprising an Analog Devices AD7171 device) for providing a test pattern stream to the set top box via a VCR Scart or UHF input of the set top box 10, and an audio processing unit, for example an oscilloscope unit 16 (such as a Pico Technology model no. ADC212) for analysing audio outputs from the set top box 10.

The test PC 4 is connected to a head end server 18 via a network. In the example of FIG. 1 the test system is installed in a factory for testing set top boxes and the test PC 4 is connected to the head end server 18 via a local area network (LAN) 19 within the factory. The head end server 18 is connected to the set top box 10 under test via cable and is operable to stream audio/visual content to the set top box 10 via the cable. Usually the head end server 18 is operable to stream content to many set top boxes under test via a cable network within the factory or other test environment.

Figure 2:
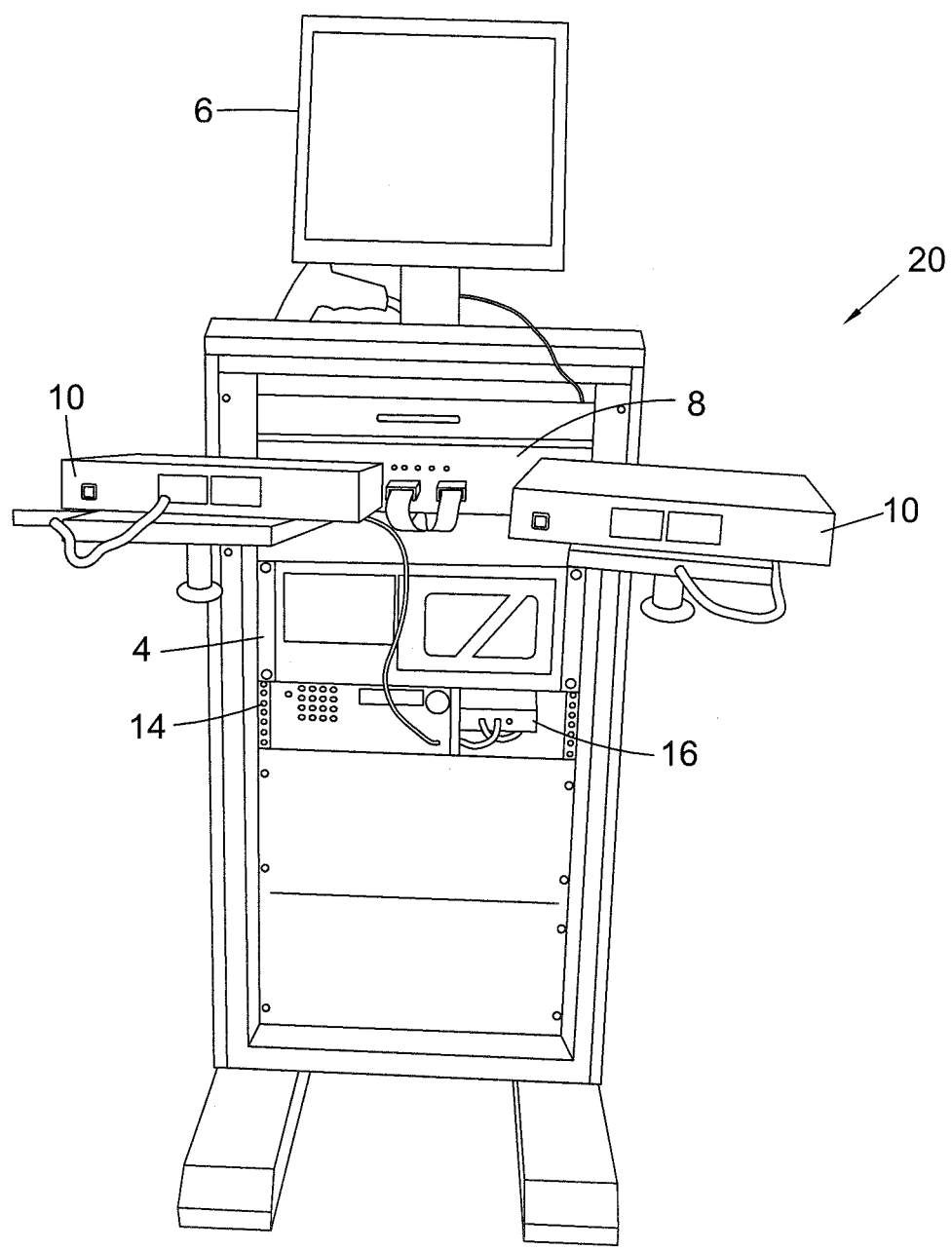
FIG. 2 is an illustration of a test station included in the system of FIG. 1.

In the example of FIG. 1, the test PC 4, the display screen 6, the interface unit 8, the infra-red emulator device 12, the pattern generator unit 14, and the oscilloscope unit 16 are installed in a test station unit 20, indicated by the dashed line in FIG. 1. The test station unit 20 is shown in FIG. 2. In a factory environment, many test stations 20 are provided each testing set top boxes and each receiving streamed test content from the head end server 18. In the embodiment of FIG. 1, the test station 20 can test two set top boxes 10 simultaneously, as described in more detail below.

The test PC 4 operates under the Windows 2000 operating system 30 (although any suitable operating system can be used). The test PC 4 includes test management software 22 that is operable to control automated testing of the set top box, communication with the head end, communication with the set top box and the interface unit, and processing and analysis of test data.

The test management software 22 is stored in the hard disk or other memory 26 of the PC and can be retrieved and executed in order to perform the set top box testing. The test management software includes image processing software 24 that can perform image processing of received video data under control of the test management software 22, and a test command module 25 that is operable to communicate with, and access test procedures or data at the set top box.

In the embodiment of FIG. 1 the image processing software 24 is written in NI C for Virtual Instrumentation environment (CV') and uses the NI Image Library (for image algorithms) and the NI analysis Library (for Fast Fourier Transforms) as well as custom code. Any other suitable image processing software can be used The test management software can use various routes for sending test commands and receiving responses from the set top box or other apparatus under test. For example, the test management software can send test commands and receive responses via a Management Information Base (MIB) module using SNMP calls via a modem included in the set top box. Alternatively the test commands and responses can be sent using a serial RS232 port via a 9-way D-type connector, or using a serial RS232 port via a logic translator via a Scart connector on the set top box, or using a serial RS232 port via a logic translator via a specific test port connector on the set top box, or by using a combination of RS232 and MIB routes.

The use of test commands provides the test management software with access to a set of commands or manufacturer's internal test procedures on the set top box under test. The commands and procedures are usually intended to be accessed manually by an operator via a test or engineering screen, but the use of test commands means that such commands and procedures can be accessed automatically by the test management software. The commands can be accessed by sending and receiving messages between the test PC 4 and the set top box 10 via a CMTS 84 at the server (in the case of MIB commands) or directly via cabling linking the test PC 4 and the set top box 10. The set top box 10 may include an ethernet card 27, which can be used to transmit and receive messages over a network linking the test PC 4 and the server 18.

In operation a test command is sent to the set top box under test from the test PC 4, via the server. Each test command is usually tied to a particular command or test within the set top box under test. For example, GET or SET commands can be used to enable retrieval of data concerning the current state of the set top box or to set the set top box to a desired state. Test commands can be used for automatically retrieving data from a set-top box diagnostics page, collecting data such as signal to noise (SNR) values or upstream/downstream power levels, and obtaining other diagnostic data. The use of test commands can save the operator from having to manually access the engineering menu page on the set top box which can take up a lot of time.

In the case of MIB test commands, the MIB command uses a unique object identifier (01D) consisting of numbers separated by decimal point, with each number representing a node on the MIB structure. For example, 01Ds for telecommunication devices of the company DPS all begin with 1.3.6.1.4.1.2682 and further numbers can be added to the sequence to access particular functions of such devices. Other OID sequences can be used to access functions of other devices, for example devices of other manufacturers. MIB functionality already exists in any DVB-C set top box as it has a cable modem built in, and part of the standard is that cable modem parameters are measured via the MIB. Any additional MIB functionality is at the manufacturer's discretion. A network operator can further implement MIB functionality within their own application code that the product operates under. Access to MIB functionality for testing purposes may, in some circumstances, only be available with the manufacturer's or network operator's permission.

The choice of route for sending test commands and receiving responses usually depends on the characteristics of a particular set top box under test, for example whether or not it includes a modem and the configuration of the set top box's own internal test procedures.

The test PC 4 also includes a dedicated High Definition (HD) image acquisition card 40 (for example a Black Magic AudioNideo capture card) which is connected to a HDMI output of the set top box (if it is HD enabled) via an HDMI cable. The HD image acquisition card 40 is operable to receive and capture frame-by-frame audio/visual output in HDMI format from an HDMI port 34 of the set top box, for further processing at the test PC 4.

The test PC 4 also includes a TV tuner card 36 (for example a Hauppage WIN TV PC TV Tuner card) that is connected to a UHF output port 38 of the set top box 10. The TV tuner card 36 is operable to tune to a desired frequency, to receive and digitise the UHF signal transmitted on that frequency and to store it, for example as an AVI file). The image processing software subsequently reads the AVI file, and performs tests on the stored image data. The tuner control software is written in an external DLL in C++ that utilises Microsoft DX9 technology, that is called from CVI. The DX9 code controls the streaming of the tuner channel data into the avi file, and is also able to provide a preview window on a desktop GUI.

A digital input/output (I/O) card 42 (for example an NI HS-D10 high speed digital input card) is provided within the test PC 4 to enable the test PC 4 to playout (via the interface unit 8) infra-red (IR) streams or to record IR stream data (received via the interface unit 8).

The test PC 4 is connected to the interface unit 8 via an RS232 cable on the PC serial port, and in operation can communicate with and send instructions to control operation of the interface unit 8 via the serial port. An Ethernet card is also provided at the test PC 4 and can be used to communicate with the server 18 or other devices via the network.

The test PC 4 includes a standard definition (SD) image acquisition card 32. The SD image acquisition card 32 is operable to receive and capture audio/visual output obtained via the interface unit 8, for further processing by the image processing software 24.

In the embodiment of FIG. 1, the SD image acquisition card 32 is a National Instruments IMAQ PCI-1411 card. That card cannot capture real time content streams and instead is used to capture a single image (for example a single frame) and deliver the image to the image processing software structure in bitmap format. The video signal is delivered into the card 32 by the interface unit 8 as a composite video signal that multiplexes from a selected output of the set top box (for example, Component, SVHS, CVBS on phono, TV scart or VCR scart). The accompanying audio signal obtained from the set top box is routed by the interface unit 8 to the oscilloscope unit 16. As the NI IMAQ PCI-1411 card cannot stream content real time, a reduced set of video tests is performed on the SD image data in comparison to those performed on the HD or UHF video outputs, in the embodiment of FIG. 1, as described in more detail below. In alternative embodiments, a video capture card (for example, a Black Magic Design Intensity Pro capture card) is used that can capture SD streaming video in real time, and in such embodiments a full set of video tests can be performed on the SD outputs of the set top box or other unit under test, if desired.

The interface unit 8 includes an IR emulator device controller 50 (for example a Cypress CS8130) for controlling operation of the IR emulator device 12 and the magic eye device 13, a video decoder/encoder and multiplexer 52 (comprising for example a Philips SAA7118, Philips SAA7103, and Philips MAX 4312) for receiving and routing analogue video inputs from set top box, a relay multiplexer 55 for routing analogue audio signals, an AC power switch device 65 (for example a custom PCB containing two Crydom MP240D3 solid state relays, one for each polarity) for powering the set top box under test, an optical audio receiver unit 56, and an interface control processor 66 (for example a PIC18F452) for controlling operation of the interface unit 8. The interface control processor 66 is connected to the test PC 4, and in operation instructions are provided by the test management software 22 of the test PC 4 to the interface control processor 66, which then controls operation of the interface unit 8 in accordance with those instructions.

The head end server 18 comprises a memory 80 (for example an array of hard disks) for storing test content and other data, a processor 82 for controlling operation of the server 18, a cable modem termination system (CMTS) 84, which is DOCSIS 1.1 compliant in this embodiment, and various stream players for streaming content in different formats to the set top boxes under test. The stream players can include a DVB-C stream player 86, a DVB-S/S2 stream player 88, and an IPTV stream player 90. The server 18 may include each of the different stream players, and one or more of the stream players can be selected for use in dependence on the properties of the particular set top box or other apparatus under test. Alternatively one or more of the stream players may be omitted from the server 18 if not required for a particular testing system. The server 18 also comprises a combiner 85 for multiplexing together signals from the CMTS and one or more of the stream players to form a combined signal, and passing the combined signal to an output of the server for transmission to the set top boxes via cable network or other delivery mechanism.

In one mode of operation, the server 18 streams a repeating loop of test content to the set top boxes. Each test station unit 20 can assess the performance of the set top box or boxes that it is testing based upon the processing of the test content by the set top box, and the streaming of the repeating loop of test content in this example is not synchronised with the testing procedure of any particular test station unit 20 or set top box.

Any desired test content can be provided by the server 18. In one mode of operation the test content comprises a sequence of frames each comprising a colour bar test pattern and a frame identifier for each frame. That test content can be particularly useful in providing automated, objective testing of various aspects of video processing by the set top box, as discussed in more detail below. The colour bar test pattern may be alternated with a short (around 10 to 30 second duration) of pre-recorded or live television content in one variant of the test.

Any suitable set top box, or other electronic equipment can be tested using the test system. In the embodiment of FIG. 1, the set top box includes an HDMI output 34, a UHF output 38 as mentioned above, and also includes a card reader 43, an RJ45 port 44, a VCR Scart output 45, a TV Scart output 46, a Component output 47, and an optical audio output 48. The set top box also includes a VCR input (not shown). Various other components (not shown) are of course included within the set top box to provide the set top box functionality. For example, in the set top box 10 of FIG. 1 a CPU, memory, audio/video processing devices, an MPEG encoder/decoder, and encryption/decryption modules are also included in the set top box and provide the basic content processing, storage, output and selection functions of the set top box. It will be understood that set top boxes with a wide range of different functionalities are available and that the testing apparatus can be configured to test any suitable set top boxes or other video and/or audio processing apparatus.

The test content, and the details of tests relating to audio and video processing by the set top box will be discussed in more detail below, but firstly an overview of the testing process is provided.

Figure 3:
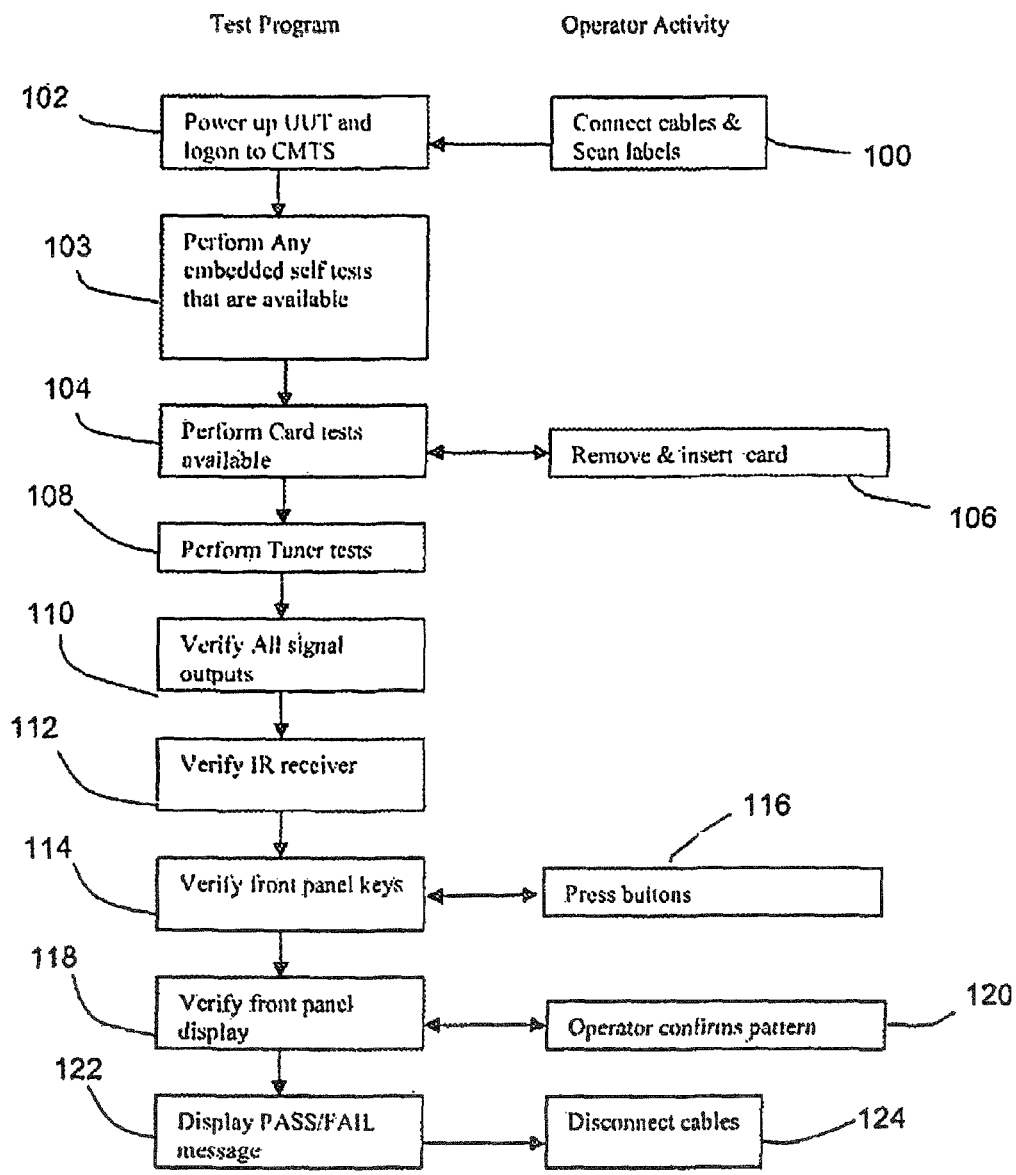
FIG. 3 is a flow chart illustrating an overview an example of a testing process performed by the system of FIG. 1.

A flowchart illustrating in overview in a testing process performed by the test system of FIG. 1 is provided in FIG. 3.

The test PC 4 displays in a window on display 6 an indication to an operator that it is ready to test a set top box. In the first stage 100 of the test process, the operator takes the set top box 10 to be tested and connects cables to link it to the test PC 4, the interface unit 8 and the head end server 18. The operator then uses a barcode reader (not shown) connected to the test PC 4 to read a barcode representative of the MAC address of the set top box 10 under test.

In the next stage 102, the test management software 22 receives and stores the barcode data from the barcode reader, and instructs the interface unit 8 to provide power to the set top box 10 via the AC power switch device 65 of the interface unit. The test management software 22 then issues test commands (for example MIB calls) to obtain the IP address from the set top box (the MIB calls in this example are sent over the factory network to the server 18 and then to the set top box).

At stage 103 the test management software 22 then monitors the booting up of the set top box and performs further automated tests using embedded self-test routines of the set top box 10 itself. For example, the test management software monitors the correct operation of the CPU, and DRAM in the set top box, checking cyclic redundancy codes (CRC) of Flash memory of the set top box, performing a non-volatile memory (NVM) reset procedure and checking the hardware revision of the set top box, using test routines installed in the set top box itself. Each of those tests is performed by sending test commands (for example, MIB commands) to the set top box to perform the test routines, and receiving data representative of the results of the test routines from the set top box, using the SNMP protocol. In each case test commands are used to retrieve from the set top box the pass or fail status, as represented by an integer value (for example, 0=in progress, 1=pass, 2=fail).

At stage 104, a message is then displayed on the display 6 prompting the operator to remove a smart card, for example a NAGRA card, from the set top box (if a smart card is used), and the operator removes and reinserts the smart card at stage 106. The test management software 22 monitors for the correct response from the set top box 10 to the removal and reinsertion of the smart card, again for example the SNMP protocol. In this case, an MIB command is used to start the smart card test, and an MIB call returns an integer value from the set top box representative of the smart card status.

The test management software then moves on to automatically testing the video and audio output from various outputs of the set top box, at stages 108 and 110 of the process of FIG. 3. The video outputs tested in the test procedure of FIG. 3 are the UHF output, the HDMI output, the VCR Scart output, the TV Scart output, and the Component Scart output.

The testing process is considered first for the UHF output. A test command is sent from the test management software 22 to the set top box 10 (for example an MIB command sent to the set top box via the head end server 18) to set the video out route from the set top box 10 to be the UHF output. The test content streamed to the set top box 10 is then output via the UHF output. In the case of testing of the UHF output, the test content is streamed to the set top box from the test pattern generator unit 14 via the interface unit 8, rather than from the server 18. The test content for the UHF testing is input to the set top box via an antenna in socket which in normal use would be connected to a roof antenna. The test can be referred to as a loop through test. The r.f. channel used for the testing is selectable, and in this example channel 30 is used.

The output stream from the UHF output of the set top box is received at the SD image acquisition card 32 at the test PC 4. The image acquisition card 32 uses DX9 code to stream the data into an avi file, for subsequent analysis by the image processing software 24. The AVI file comprises a set of frame data for each frame or the stream. Each set of frame data comprises a set of pixel signals, each pixel signal comprising a R, G and B value.

The sets of frame data are then processed by the image processing software 24 of the test management software. It is an important feature of the embodiment of FIG. 1 that the testing of the video output from the set top box is performed automatically and does not rely merely on the visual assessment of the video output when displayed on a display screen by an operator.

Figure 4A:
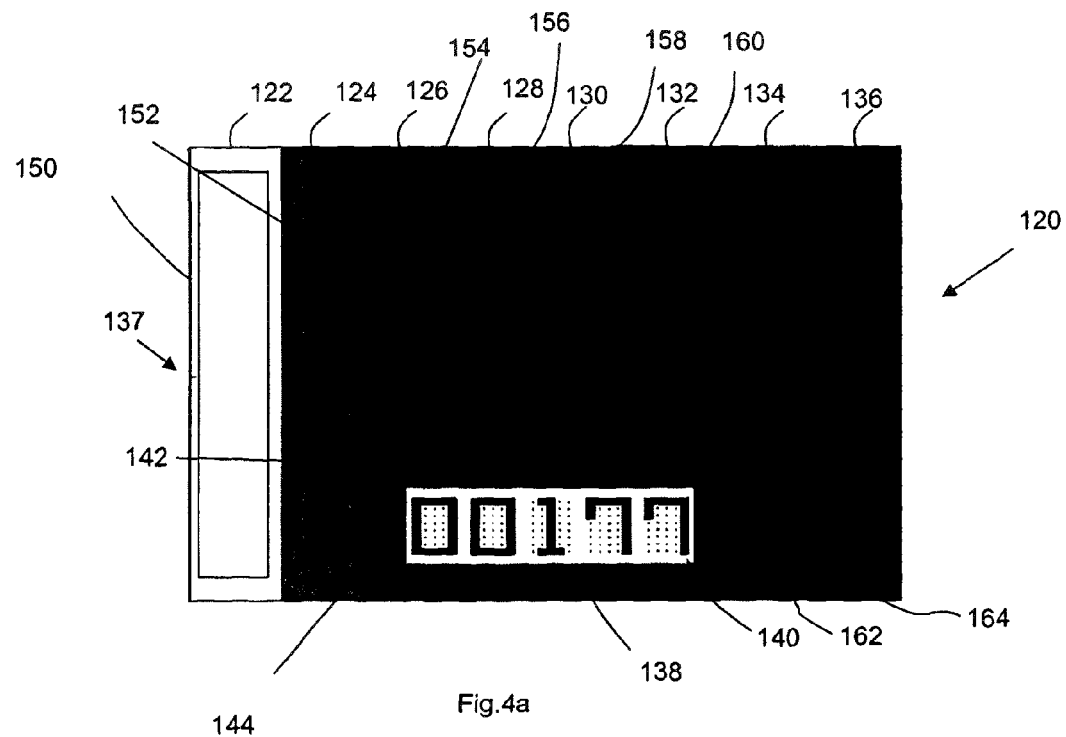
FIGS. 4a and 4b are illustrations of a frame of test content.
Figure 4B:
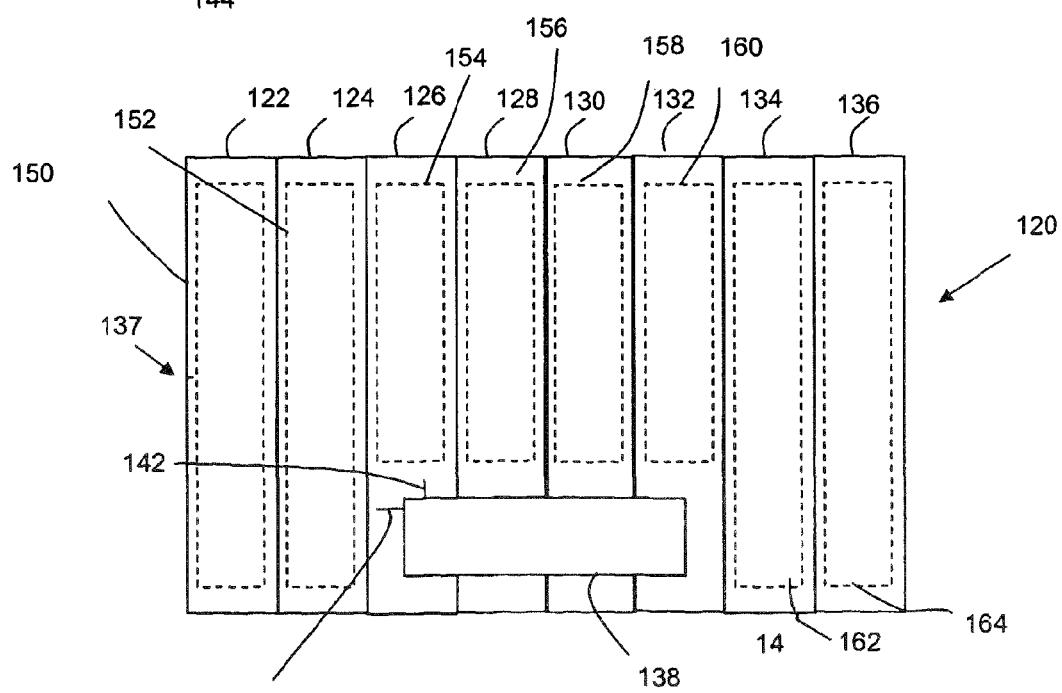

Before considering the testing in more detail, the test content is described in more detail with reference to FIGS. 4a and 4b, which shows a frame 120 included in a sequence of frames in the test content. FIG. 4b shows the frame of FIG. 4a with shading removed for clarity. Identifier numerals are also not shown in the identifier region 140 in FIG. 4b, although they would usually be present in practice as shown in FIG. 4a.

The frame comprises 8 colour bars 122, 124, 126, 128, 130, 132, 134, 136, each of different colours (white, yellow, cyan, green, magenta, red, blue, and black). Each colour bar is defined by respective R, G and B values. An identification line 137 (also referred to as a pixel delay line) is included in the frame, and is used to indicate where the white colour bar starts. In the example of FIG. 4, the identification line 137 is 20 pixels long. In operation, the image processing software 24 reads the image date and determines the location of the identification line 137, and uses that determined location to detect whether there has been an image phase error, in which the image data is shifted to the right erroneously. If the identification line is not located then the image processing software 24 indicates an error.

The frame also includes an identifier region 138 that contains a frame identifier 140 that identifies the frame, and distinguishes it from other frames in the sequence. In the example of FIG. 4, the frame identifier is the number (in this case 00177) of the frame in the sequence, and the number is incremented by one in each successive frame in the sequence. The colour bars remain the same in each frame of the sequence. Two alignment marks 142, 144 are provided in the form of a vertical line 142 and a horizontal line 144 that at one end are adjacent to the identifier region 138.

Figure 5:
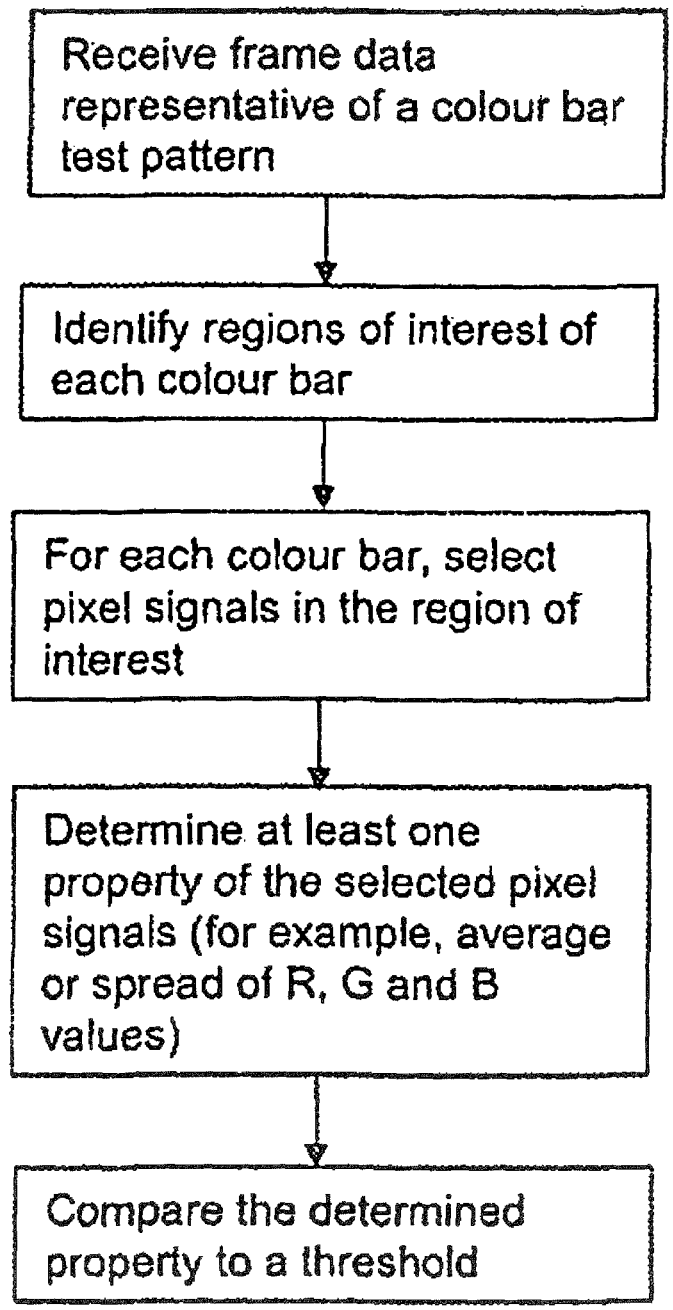
FIG. 5 is a flow chart illustrating in overview a colour test process.

Each set of frame data is passed to the image processing software 24 in turn, and several tests are performed by the test management software 22 on each set of frame data. A flow chart illustrating in overview a test for colour processing is provided in FIG. 5.

In order to test the colour processing the test management software selects pixels falling within a predetermined region of interest (ROI) of each colour bar of the frame, and compares the R, G and B values of those pixel signals to the expected R, G and B values of that colour bar. The test management software includes or is able to access stored colour data comprising the expected R, G and B values for each of the colour bars 122, 124, 126, 128, 130, 132, 134, 136.

The predetermined region 150, 152, 154, 156, 158, 160, 162, 164 for each colour bar is shown in FIG. 4. It can be seen that the predetermined region spans a plurality of pixels in both the horizontal and vertical directions, and that the predetermined region excludes pixels in regions close to the borders between colour bars and close to the edges of the frame. It can also be seen that the predetermined regions make up a significant proportion of each colour bar, for example at least 80% in the example of FIG. 4. It will be understood that the regions of interest are not defined or distinguished in the video signal sent from the set top box, but are applied by the test management software 22 when processing the data for testing purposes.

The specific regions of interest for each colour bar, are defined in software that define the analysis boundary for each colour. The boundary differs depending on the resolution of the captured frame. Widths and heights of each region of interest are selected so that each region of interest is clear of the frame edges, the transition from one colour to the next and from the identifier region. That ensures a robust test algorithm and set of limits can be applied to each colour. The size and position of the regions of interest are not fixed to be the same for all input streams, and are programmable for example according to frame resolution or data format of the captured stream.

It has been found that even in acceptable, normal operation some distortion in colour in the border regions can occur, either due to artefacts of the colour processing of the set top box or due to the analogue/digital conversion process, and so excluding those border regions can produce a more useful test.

For example for analogue signals (and sometimes digital signals) the transition from one colour to the next is usually not clean, and may take, for example, 5 pixels to change completely. Although not always noticeable to the naked eye, at pixel level the change is gradual and the colour levels within the transition regions are not at exactly the expected values for the colours or the colour bars. Also, decompression artefacts can be present at transitions between colour bars, close to the frame edges and/or close to the identifier region.

By ensuring the predetermined region includes a significant number of pixels, the testing can pick up on faults occurring in individual pixel regions, which may not be picked up by inspection of an image by an operator. Furthermore, by ensuring that the predetermined region spans a plurality of horizontal rows, white lines or similar faults can be detected.

The number of pixels in each region of interest usually depends on the resolution and format of the input signal, and can be set automatically by the image processing software 24. For instance, for a PAL SD frame of resolution 788×576 pixels and having an identifier region located across the cyan, green, magenta and red colour bars, the regions of interest for the colour bars may have the following dimensions:—White, Yellow, Blue, Black: 40×530 Cyan, Green, Magenta, Red: 40×400

For a HD frame of resolution 1920×1080 pixels, and similar layout, the regions of interest may have the following dimensions:—White, Yellow, Blue, Black: 180×960 Cyan, Green, Magenta, Red: 180×740

Each pixel signal consists of three values, one for each of red (R), green (G) and blue (B). The image processing software 24 calculates the average value of R, G and B values for the pixels in the colour bar (for example, across 172,800 pixels for the white, yellow, blue and black colour bars for H-ID data, or across 21,200 pixels for SD data). The image processing software also calculates the spread (difference between maximum and minimum value) in each of the red green and blue values across all of the pixels in the region of interest.

In one test, the test management software determines whether the R, G and B values averaged across all of the selected pixels match the expected R, G and B values for that colour bar, or if any difference in the R, G and B values is within a predetermined threshold amount. If the averaged R, G and B values do match the expected value or are within the threshold then the processing of that colour bar by the set top box is determined to have passed the test. The test can be repeated for each colour bar and for each frame. Alternatively, the test can be performed for average R, G and B values for each colour bar averaged across all frames in the sequence.

In another test, the test management software determines whether the spread in R, G and B values differs from the expected values by greater than a threshold acceptable amount, for each of the colour bars. If that is the case then the test is failed.

For example, the R, G and B values expected for the white bar are R=254, G=254, B=254 in the example of FIG. 4, where the values represent the digitized video signal amplitude on a scale of 0-255. In the example of FIG. 4, the spread of values of G for the selected pixels is 5 (for example G values between 254 and 249 are measured), the spread of values of R for the selected pixels is 7, and the spread of values of B for the selected pixels is 5. In that example, for UHF data, the predetermined threshold spread for acceptable performance is set at 20 and the set top box in this case passed the colour bar test for the white colour bar as the spread for each of the values was less than the threshold.

The acceptable spread of values in R, G and B values for each colour bar region of interest are set at different levels depending on the format of the audio/visual input from the set top box or other apparatus under test. Examples of acceptable spread limits for R, G and B values for different output from the set top box, according to one mode of operation, are provided in Table 1.

TABLE 1

| Output | Typical Threshold |
|---|---|
| UHF | <30 |
| Scarts, SVHS, Phono | <20 |
| Component | <10 |
| HDMI | <2 |

The threshold limits are usually set on a product basis and are part of the product specific test limits. Different manufacturers have different performance levels and hence have specific limits according to the expected hardware performance.

Depending on preset test parameters, the set top box is determined to pass or fail the test in dependence on whether a single frame, or a predetermined number of frames, fail the test. Usually if the set top box fails a single test in the test sequence then it is determined to be faulty and is passed for disposal or repair. The testing procedure can be terminated as soon as a single test is failed, but more usually every test in the sequence is performed so that the state of the set top box can be fully characterised.

Another test is performed on the white colour bar region of interest only, to test for white balance. The white balance test checks the difference between RGB values for each pixel and determines that they are closely matched, (for example, difference between R, G and B value <5, or <2 depending on the threshold that is set). The test can detect tone drifts, for instance that can indicate an image with an underlying tone change towards a primary colour.

Figures 7A, 7B:
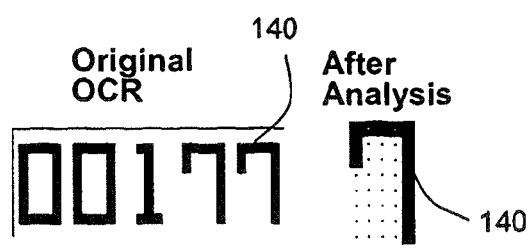
Figure 8:
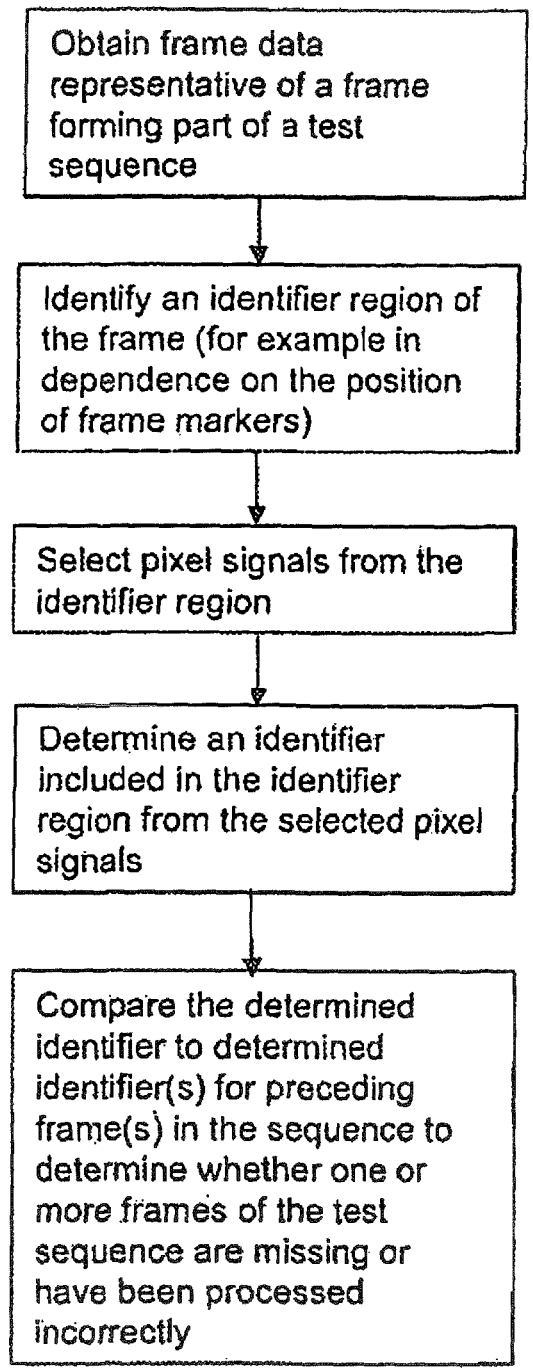
FIG. 8 is a flow chart illustrating in overview a frame sequence test process.

Another test performed by the test management software 22 on each set of frame data is described in relation to FIGS. 4, 7a and 7b. As mentioned above each frame in the test sequence illustrated in FIG. 4 includes a frame identifier. The image processing software includes optical character recognition (OCR) and other pattern recognition tools. An example of the test procedure is illustrated in overview in the flow chart of FIG. 8.

In operation the image processing software 24 processes each set of frame data to determine the location of the alignment marks 142, 144 to determine where the start row and the start column of the outer edge of the white background of the identifier region 138 are located. Having determined the location of the alignment marks 142, 144 and thus the start row and start column of the identifier region, the image processing software 24 determines the boundary of identifier region 138 using the determined start row and column, and knowing the expected size of the identifier region 138. The image processing software then applies optical character recognition (OCR) or other image processing techniques to process image data within the boundary of the frame identifier region to determine the frame identifier.

In the example of FIG. 4, the identifier region 138 comprises five separate regions, each for display of a different numeral of the identifier, and each made up of an array of 5 by 8 pixels. Each of the separate regions can be located with reference to the location of the alignment marks. The identifier region 138 and one of the five separate regions in isolation are shown in FIGS. 7a and 7b respectively.

The image processing software 24 applies an optical character recognition or other image processing technique to the identifier region, to identify the numerals (or other identification characters or other symbols) located in the identifier region and thus to determine the identifier for the frame, in this case 00177. The test management software 22 can in some modes of operation compare the determined identifier to a set of expected identifiers for the sequence of frames to determine whether the identifier seems to have been determined correctly. If the identifier cannot be located or properly identified then either that frame is disregarded for the purposes of the test, or the test is considered to have been failed.

The particular technique that is applied to process the data of the identifier region depends in part on the form of the identifier included in the identifier region.

Figure 6:
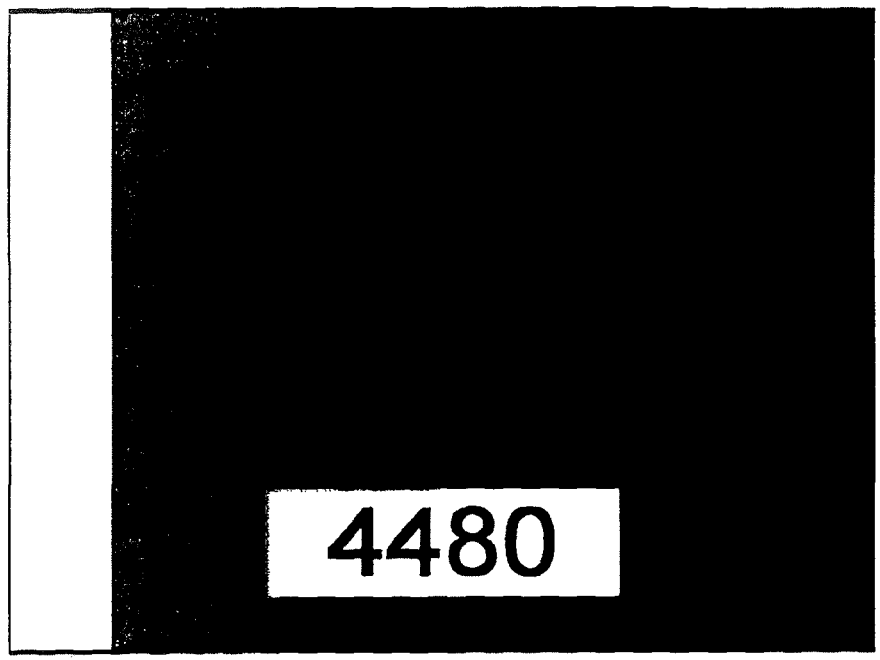
FIG. 6 is an illustration of a further frame of test content.

In one example, the identifier is included as characters of a standard font (for example, Arial) and the image processing software uses a learned character set file for the font used as a reference, the character set file contains reference templates for 0 to 9 only, as well as different files for the frame resolution. These files are created using NI Image tools. The NI Image library routines use the character set files to find a match for each character and returns a string to the calling code, this string is converted to an integer variable and checked against the previous number stored and verified the sequence is correct. The NI library routines are not fast and typically take several hundred milliseconds to execute and therefore usually cannot run in real time. An example of a frame identifier in Arial format is illustrated in FIG. 6.

In another example (illustrated in FIGS. 4, 7a and 7b) a custom digit font is used to represent the identifier digits. In this example, the image processing software determines an exact inspection grid for each individual numeral (or other character) included in the identifier, based upon the determined location of the alignment marks 142, 144. The inspection grid for one of the characters of the identifier of FIGS. 4 and 7a is shown in FIG. 7b.

The inspection grid for each character is a 5 by 8 point grid, thus comprising 40 points. Each point is checked to see if it is black or white, and a bit in a 64 bit word is set according to what is detected (in this case bits 40 to 63 are unused). For example for character '7' shown in FIG. 7b a word can be set as follows starting from the top left point as the LSB, working across and down to point 40:

MSB UUUU UUUUU UUUUU UUUUU UUUUU 10000 10000 10000 10000 10000 10001 10001 11111 LSB. (where a 1 is black, 0 is white, U is unused and set same as white, MSB=most significant bit, LSB=least significant bit) Or—

MSB UUUU UUUUU UUUUU UUUUU UUUUU 01111 01111 01111 01111 01111 01110 01110 00000 LSB (where a 0 is black, 1 is white, U is unused and set same as white)

This creates a unique signature for that character irrespective of image dimensions, the code then simply checks a single reference lookup list of 10 signatures for 0-9 to find a match and determine the number. No NI image library code is used in that example, and the software routine for identifying the characters is written in C++ classes to help achieve real time executions speeds. In the case where a frame of data is delivered every 40 milliseconds, the software is able to complete the entire algorithm on an HD frame of 1920×1080 resolution on a 2 Ghz dual core processor in about 32 milliseconds, and can also process the Audio in about 0.5 millisecond, giving around 33 ms total executions time. Thus, that process can be run in real time, given a suitable CPU used in the test PC.

As it is known that the identifiers will be within identifier regions, and thus the identifier recognition procedure does not have to be applied to all of the video data of the frame, relatively simple characters comprising a relatively small number of pixels, can be used for the identifiers without significantly increasing the risk that the identifiers will not be identified correctly. The chances of correct recognition can also be increased by using a known, and for example a relatively plain and contrasting, background in the identifier region (for example black identifier pixels on a white background in the example of FIG. 4).

The test management software 22 repeats the procedure for each of the sets of frame data in the sequence, and thus determines the identifier for each frame in the sequence. In one mode of operation, the test management software 22 compares the identifiers determined for each frame in succession and determines whether the identifiers follow an expected sequence (for example, the identifiers in the example of FIG. 4 are expected to increment by one for each frame in succession). If a skipped or frozen frame problem occurs (for example if a frame in the sequence is missed or incorrectly processed by the set top box) then that can be identified by a missing identifier in the sequence. Such skipped or frozen frame problems can be difficult or impossible for an operator to detect from visual inspection of a displayed test pattern sequence.

Figure 9A:
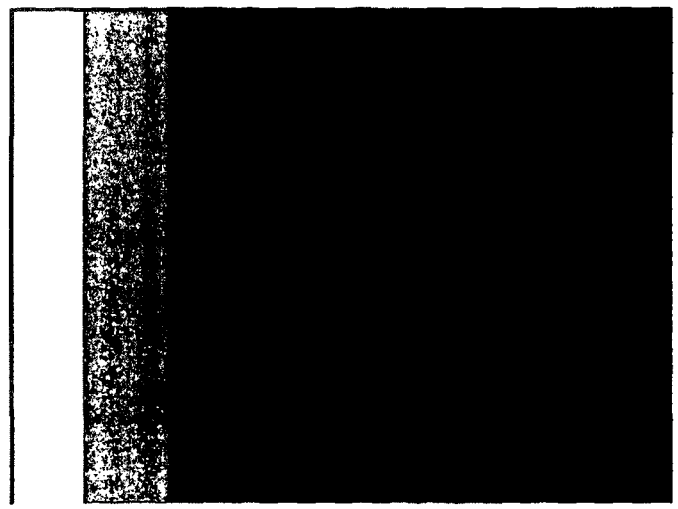
FIGS. 9a and 9b are illustrations of a further test pattern, shown with and without regions of interest marked.
Figure 9B:

The colour bar tests and the frame sequence tests can be performed separately, and the test sequence can include colour bars without frame identifiers (for example as illustrated in FIGS. 9a and 9b). FIG. 9a shows the colour bar test pattern of an image captured by the test system, and FIG. 9b shows the colour bar test pattern with the regions of interest for which the colours are tested (for example RGB values verified against predefine limits) indicated.

Alternatively, the test sequence can include frame identifiers on each frame overlaid, for example, on live or recorded streamed content (for example a live or recorded TV programme). In other examples the frame identifiers are not included on each frame, but are included on frames with a predetermined spacing (for example, every 5 frames or every 10 frames). Similarly, the testing can be performed on frame identifiers of frames with a predetermined frame spacing (for example every 5 frames or every 10 frames) regardless of whether frame identifiers are present in every frame of the test sequence.

In the example of FIG. 4, the test sequence includes both the colour bars and the frame identifiers on each frame, and so the test management software 22 can perform both the colour bar tests and the frame identifier sequence tests on the same frames. Some of the regions of interest for the colour bars, for which pixels are selected for analysis, are reduced in size to accommodate the frame identifiers.

The data output from the UHF output includes audio data along with the video data, and the system tests the audio data as well as the video data. The audio data from the AVI file that stores the received data from the UHF output is represented in digitised numerical value by the sound card of the PC. An audio loop runs from the plug-in tuner card to the line in of the sound card.

The audio component of the test sequence in the example of FIG. 4 comprises a constant frequency sin wave output on the left and right audio channels. The frequencies chosen for the left and right channels are different (for example 1 kHz and 3 kHz). The received audio signals are analysed to identify the characteristics of the audio signals on each of the left and right channels.

The test management software 22 determines from the audio data whether the frequencies received on the left and right channels match those expected for the test sequence. If they do match, for example if the received frequencies are within a predetermined threshold amount of the expected frequencies, then the set top box is judged by the test management software 22 to have passed one of the audio tests for the UHF output. Other properties of the received audio signal (for example signal to noise ratio, amplitude, distortion, noise or spread of the audio frequencies) can also be determined and the test management software 22 can also determine whether those properties are within acceptable limits and pass or fail the set top box 10 in dependence on the determination.

In one example, the following properties are determined for both left & right channels:
1. Frequency (sine wave edges counted for the 40 ms period)
2. Amplitude (max min amplitude determined)
3. Noise (using Fast Fourier Transforms from NI Analysis Library or other suitable function library)
4. Distortion (using Fast Fourier Transforms from NI Analysis Library or other suitable function library)

Figure 10:
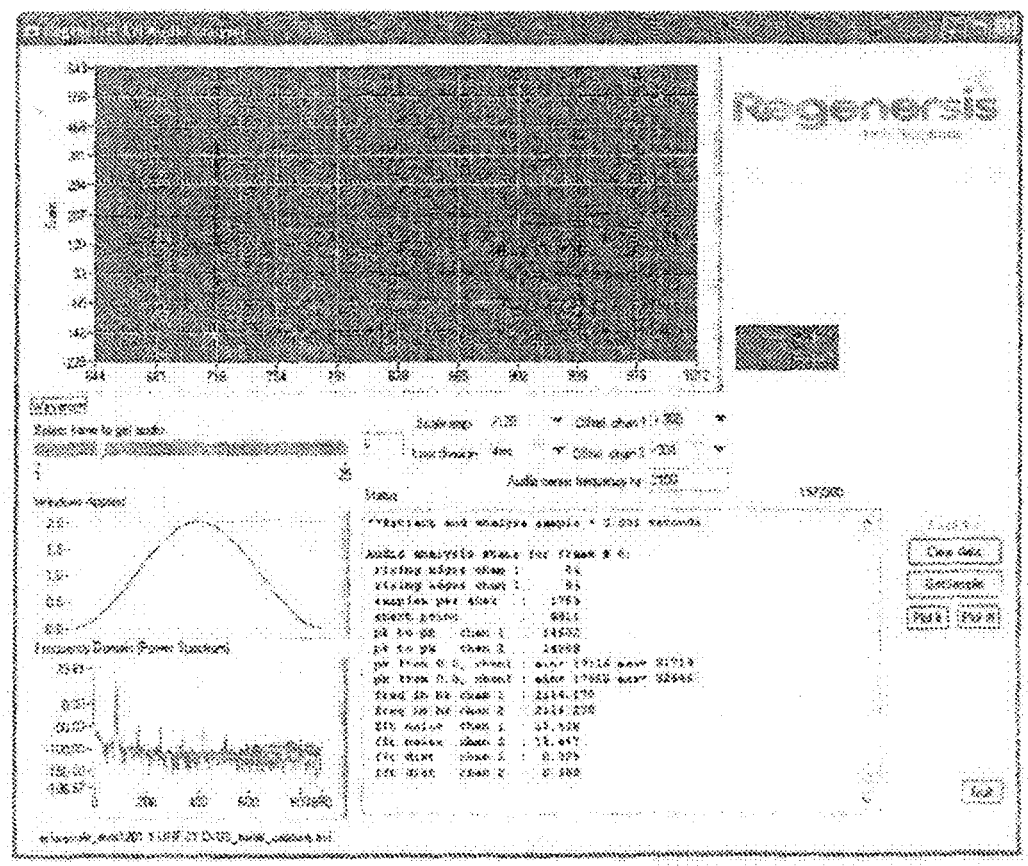
FIG. 10 is a screen shot of a window illustrating audio signal testing.

A window can be displayed to an operator providing an indication of the received audio signals and testing if desired. An example of such a window is shown in FIG. 10. Although the testing is performed automatically and does not require operator input, the display can provide a backup to enable the operator to assess whether the testing seems to be proceeding correctly.

The testing of video and audio outputs is then repeated for the TV Scart output, the VCR Scart output, the HDMI output (if the set top box is HDMI enabled) the VCR Scart output, and the Component Scart output (for which the YPbPr colour space encoding scheme is used). In the case of the testing of the HDMI output, the received audio/video data is streamed to an AVI file using DX9 code at the test PC for subsequent testing. The testing for each of the outputs is similar to that described for the testing of the UHF output, and the input test sequence used is the same. However, in the case of the embodiment of FIG. 1, only single frames of video data are tested for the TV Scart output, the VCR Scart output, and the Component Scart output due to the limitations of the video capture card 32. Therefore, the frame identifier tests are omitted for those outputs.

In the described example, the testing using frame identifiers is only performed for the UHF output (and the HDMI output if the set top box is HDMI enabled) although it can be performed for any of the outputs.

The testing of the TV Scart output is also repeated with the test pattern sequence provided from the pattern generator unit 14 via a VCR Scart input of the set top box, rather than streamed to the set top box via the head end server 18. That enables testing of the processing of content received from a VCR in normal use.

The testing of the audio output is also performed for audio signals output from the optical audio output of the set top box. The audio signal is received from the optical audio output of the set top box at the interface unit 8 and is passed to the oscilloscope unit 16, which samples the received signal to provide digitised audio sample data for each 40 ms frame period, for subsequent processing The digitised data is stored by the oscilloscope unit 16 to a software buffer represents the data in volts. The same or similar tests as those performed for the audio output on the UHF output are performed for the optical audio output.

The test management software 22 next tests the operation of the TV tuner of the set top box. The test PC 4 sends test commands to instruct the TV tuner of the set top box to tune to specified frequencies. The TV tuner of the set top box tunes to the specified frequencies and receives test content from the server 18. The test PC 4 requests tuner measurement data from the set top box using, for example, MIB calls or other test commands, and receives and analyses the tuner measurement data (for example, lock status (true or false), pre & post RS error rates, and signal to noise value) to verify correct operation of the set top box TV tuner.

In the embodiment of FIG. 1 the TV tuner test is performed for tuner frequencies of 131 MHz, 411 MHz and 810 MHz. However, tuner test frequencies are dependent on the particular design of the set top box under test. The test frequencies can vary in dependence upon manufacturer or network operator specifications. In the case of silicon tuners, tuner tests are simplified into a low, mid and high band test, whereas in the case of older non-silicon tuners, there are band switches internally, and the test frequencies are usually a lower and upper test frequency of each band switch for the design. There is a dead spot in these type of tuners between the band switches where the product does not operate that need to be avoided. All these characteristics can be catered for by the test software 22.

The test management software 22 next tests operation of the infra-red receiver and associated components of the set top box using the infra-red emulator device 12, at stage 112 of the process of FIG. 3.

Figure 11:
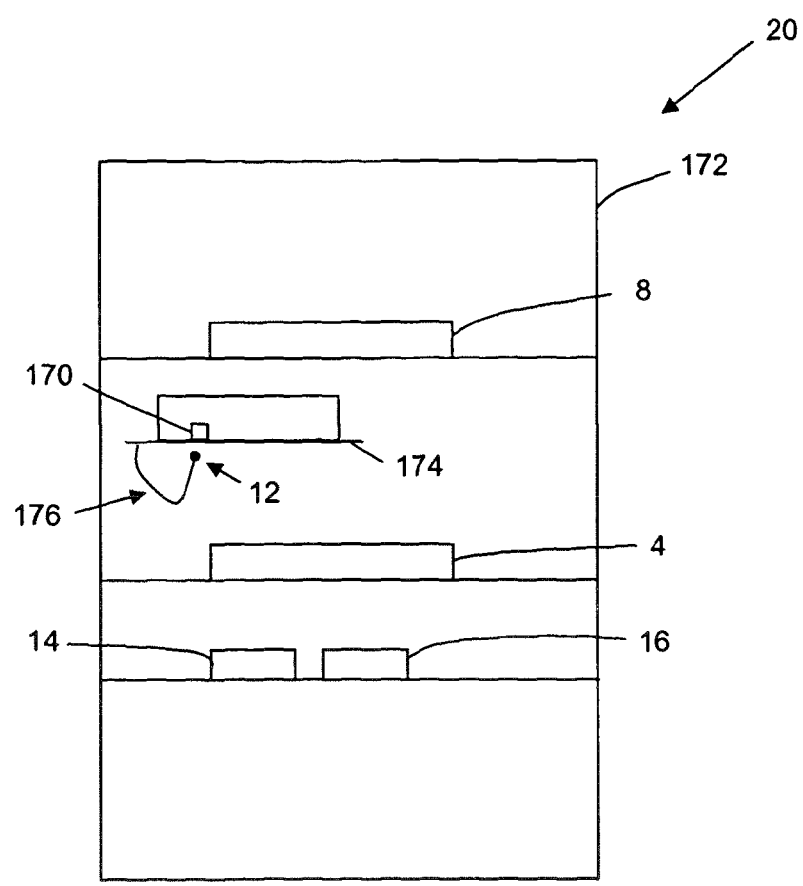
FIG. 11 is a schematic illustration showing an infra-red test device mounted adjacent to a set top box under test.

The infra-red emulator device 12 is shown in FIG. 11 positioned adjacent to and aligned with an infra-red detector 170 of a set top box 10 under test. In the embodiment of FIG. 11, various components of the test station 20 are mounted on a rack 172, including the test PC 4, the interface unit 8, the pattern generator unit 14 and the oscilloscope 16.

The set top box 10 under test is mounted on a platform 174. Usually the area of the platform is of similar size to the footprint of the set top box 10, and so when the set top box is mounted on the platform 174 for testing it is in a well-defined position in relation to the test station 20.

Figure 12A:
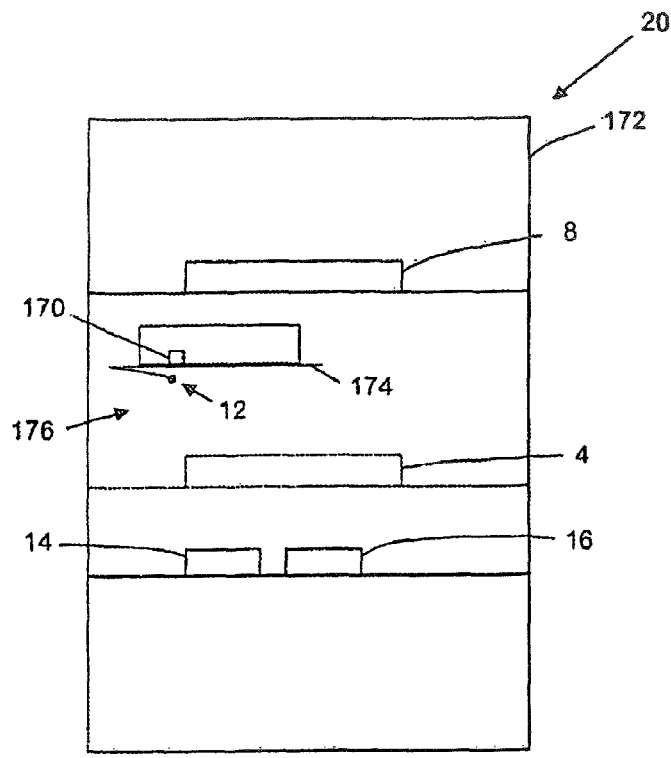
FIGS. 12a and 12b are schematic illustrations showing an infra-red test device in an alternative embodiment.
Figure 12B:
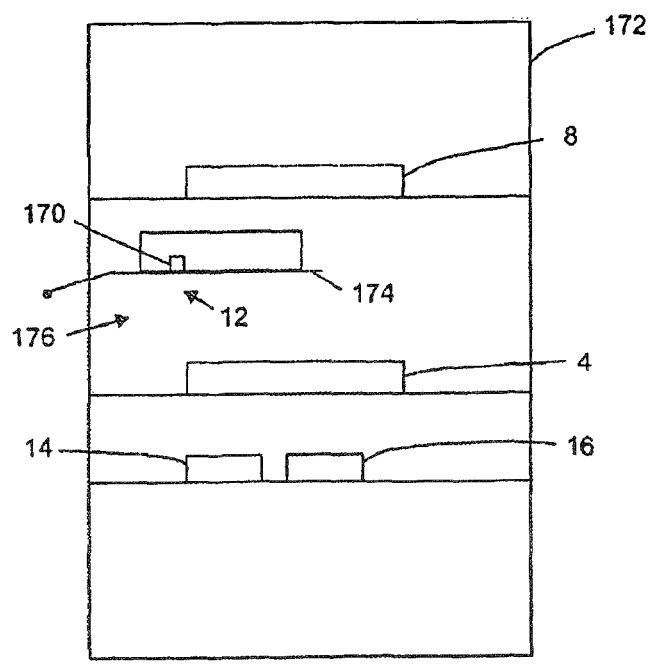

In the embodiment of FIG. 11, the infra-red emulator device 12 is mounted on a flexible stem 176 that is connected to the platform 174. The stem 176 is made from semi rigid wire that can be shaped and that is covered in rubber heat-shrink sleeving. Prior to testing, the flexible stem 176 can be moved by an operator to align the infra-red emulator device 12 with the infra-red detector 170 of the set top box 10, and to position the infra-red emulator device 12 adjacent to the infra-red detector 170. Wiring linking the infra-red emulator device to the interface unit 8 is usually run through the stem 176. In an alternative embodiment, the IR emulator is in the form of a mouse device including an IR LED, which can placed at a desired position relative to the IR detector 170. In another alternative embodiment, the IR emulator is located on a hinged arm that is connected to the platform 174 and that can be swung under, or otherwise in position relative to the platform 174 so that the IR emulator device 12 is adjacent to and aligned with the IR detector 170, as illustrated in FIGS. 12a and 12b (in which the hinged arm is shown in and out of position relative to the IR detector).

Figure 13:
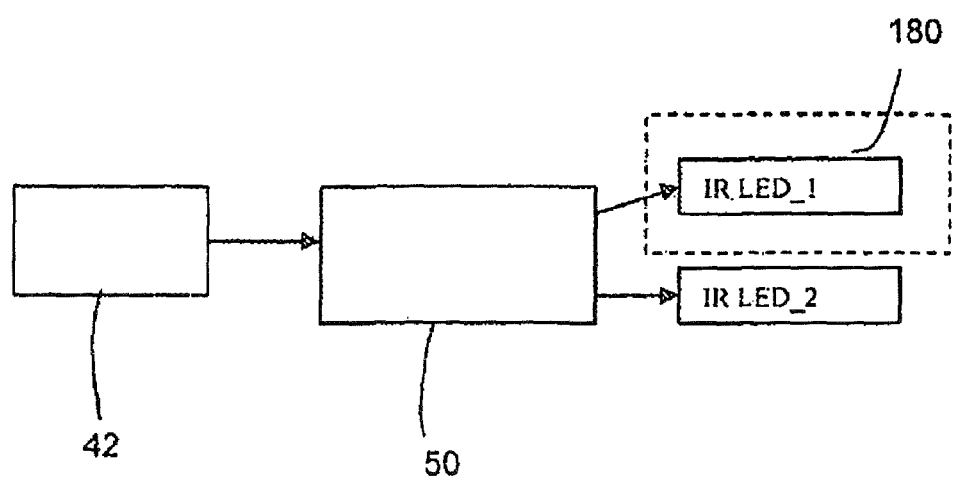
FIG. 13 is a schematic diagram showing components of an infra-red test system.

In operation, power and control signals from the IR emulator device controller 50 can be sent to the infra-red emulator device 12 via the wiring in the stem 176. As shown schematically in FIG. 13, the test management software 22 controls operation of the infra-red emulator device 12 by sending control signals via the digital input/output (I/O) card 37 to the device controller 50 to an infra-red LED 180 of the emulator device 12.

The infra-red emulator device comprises an infra-red transmitter, in the form of the IR LED 180 in this example, that is configured to transmit an infra-red output signal that has an amplitude and frequency that is determined by control signals sent from the IR emulator device controller 50.

The IR emulator device controller 50 stores, or has access to, the operating frequencies and the control sequences (timings, amplitudes frequencies) of infra-red signals used by a remote control unit to control in normal operation different functions of the set top box 10 under test.

In operation, the IR emulator device controller 50 is operable to control the infra-red emulator device 12 to output infra-red signals to which the set top box 10 is expected to be responsive. In the embodiment of FIG. 1, in one example a specific key press sequence is learned and saved in a file at the test PC, and is recalled and played out via the digital input/output card 42.

The IR emulator device controller 50 controls the infra-red emulator device 12 in response to a stream of instructions received from test management software 22 via the digital I/O card 42.

In operation, the test PC 4 sends test commands to the set top box 10 (for example via the server 18) instructing the set top box 10 to return an output (for example, a hexadecimal value) representative of the last IR button press received. Usually the test management software 22 instructs the infra-red emulator device 12, via the IR emulator device controller 50, to output a sequence of signals corresponding to different button presses at a remote control unit (for example, button presses of each button on the unit in turn, or button presses corresponding to the most important functions such as on/off, volume up/down, channel up/down, numbers 0 to 9). The test management software 22 then monitors the outputs from the set top box, sent in response to test commands, and determines whether the outputs from the set top box are representative of button presses that match the button presses represented by the sequence of signals output by the infra-red emulator device. If they do not match then the test management software 22 indicates that the test has been failed, or repeats the test one or more times before concluding that the test has been failed if the button presses still do not match.

The test management software 22 and the IR emulator device controller 50 are arranged to operate so that the amplitude of the IR signals at the output of the infra-red emulator device 12 are significantly attenuated in comparison to the amplitude of corresponding IR signals that would be output by a remote control unit for the set top box in normal operation. That enables the infra-red emulator device 12 to be positioned adjacent to the infra-red detector 170 during the testing, thus saving significant space within the testing environment, whilst providing that the amplitude of the signals received at the infra-red detector 170 are similar to those that might be received in normal operation from a remote control device.

In one mode of operation, the amplitude of the infra-red signals output from the infra-red emulator device 12 are set to be substantially the same as the amplitude that would be expected from a remote control device at a normal operating distance (such as a distance from a set top box, for example between 2 m and 5 m, that a user would be expected to sit in normal operation).

In another mode of operation, test management software 22 and the IR emulator device controller 50 are configured to repeat the test for several different output amplitudes, for example corresponding to maximum battery power of a remote control unit and a normal operating distance from a set top box, a minimum acceptable battery power and a normal operating distance, and a minimum acceptable battery power and a threshold minimum distance (for example 5m).

Figure 14:
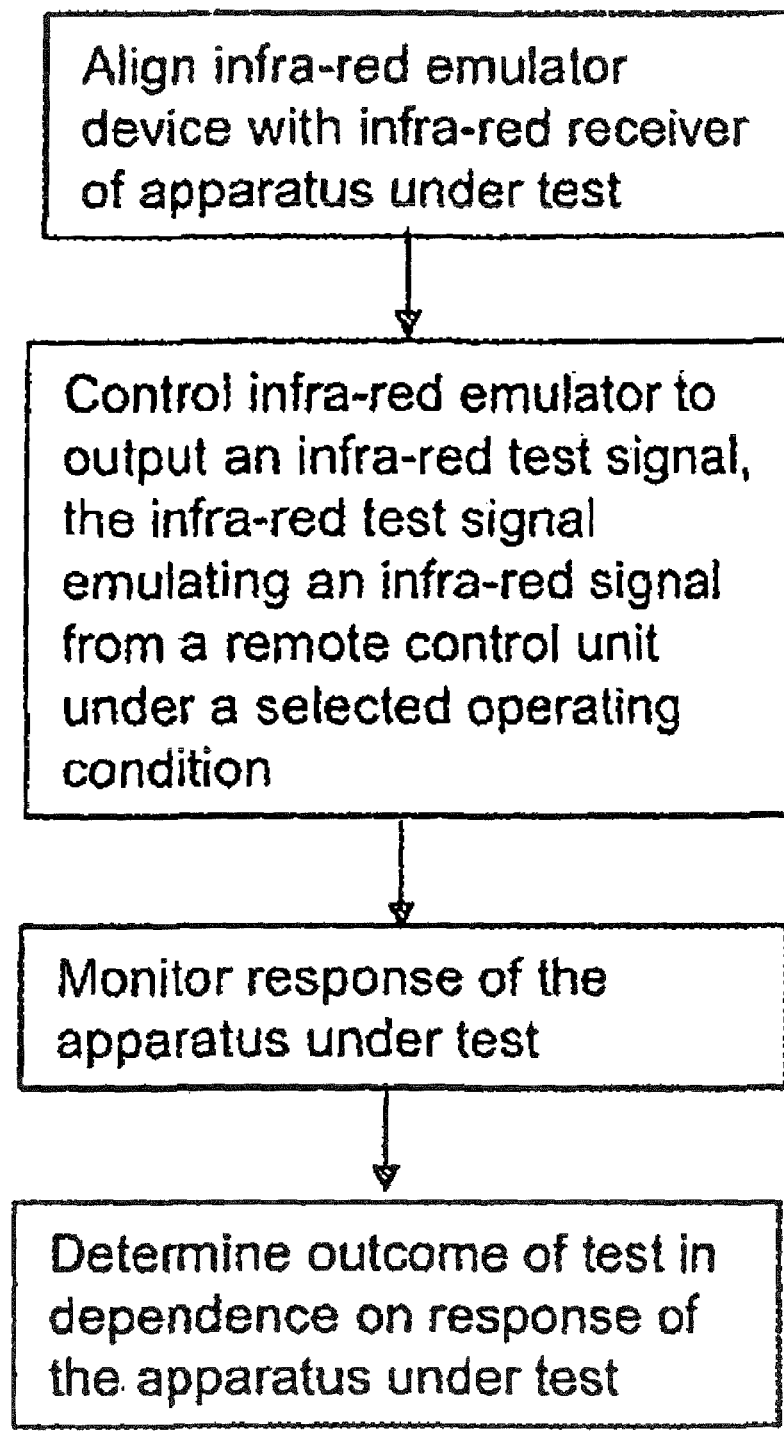
FIG. 14 is a flow chart illustrating in overview a testing process for an infra-red receiver.

An example of a test process for testing operation of the infra-red receiver and associated components of the set top box is illustrated in overview in FIG. 14.

The test management software 22 then performs a further test at stage 118 of the process of FIG. 3, to test the magic eye functions of the set top box. The magic eye functions enable control signals from a remote control unit to be received at the set top box, processed and sent via cabling to another set top box or other device at another location (for example in another room). The purpose of magic eye functionality of a set top box is to allow a user to control the set top box via a remote control in a different room to where the set top box resides, when the TV being watched is connected to the set top box via a UHF out cable. A magic eye is a piece of receiver circuitry that is designed into the RF modulator of the set top box that decodes a DC signal that is received on the UH-IF out connector that represents a button press from the remote control. The device that sends this is a small IR receiver that converts the user remote signal onto the UHF out cable connected to the set top box. Such a device is usually a third party device, for example the TV Link device is commonly used in the UK.

The test management software 22 instructs the infra-red emulator device 12, via the IR emulator device controller 50, to output a sequence of signals via the magic eye device 13, corresponding to different button presses at a remote control unit. The test PC 4 sends test commands to the set top box 10 instructing the set top box 10 to return outputs representative of magic eye operations in relation to the signals received from the infra-red emulator device 12.

The operator is then instructed, via the display screen 6, to press each of the front panel keys in turn, at stage 116. The test management software 22 monitors for the correct response to the button presses via test commands sent to the set top box 10.

At stage 114, the test management software then sends a test command to the set top box to start a built-in front panel LED test. The operator views the front panel to determine whether all of the LEDs have lit correctly. If so, he enters an appropriate input (yes or no) via a keyboard or touch screen input displayed on the display screen 6. The input is represented by an integer value 1=fail or 0=pass by the test management software 22. Optionally, as represented at stage 120 of FIG. 3, the lighting of the LEDs can be monitored automatically via a camera included in the test station 20 and aligned with the front panel of the set top box.

The test management software then, at the next stage 122, transmits the results of the test to the server 18, displays a pass/fail message to the operator on the display 6, powers down the set top box and instructs the operator at stage 124 to remove the cables from the set top box and remove the set top box from the test station in preparation for the testing of the next set top box.

A summary of examples of tests that can be performed in certain modes of operation of the embodiment of FIG. 1 described above is provided in Table 2 below.

TABLE 2

| Test | Component or output tested |
|---|---|
| 1 | LED |
| 2 | IR Receiver |
| 3 | Magic Eye |
| 4 | TV Scart |
| 5 | VCR Scart |
| 6 | RF output (UHF) |
| 7 | HDMI |
| 8 | Component video output |
| 9 | L/R audio output |
| 10 | Digital audio output |
| 11 | Cable modem |
| 12 | Tuner 1 - 131 MHz |
| 13 | Tuner 2 - 411 MHz |
| 14 | Tuner 3 - 810 MHz |
| 15 | Smart card |
| 16 | Front panel keys |
| 17 | HDD |

The tests are shown in a different order in Table 2 than as described above in relation to the flowchart of FIG. 3. The test management software 22 can control the testing process so that the tests are performed in any suitable order.

It is a feature of the embodiment of FIG. 1 that almost all of the tests are automated, with only the LED test requiring operator judgement. Even the LED test can be performed automatically if required by including a camera in the test station 20, as described above. However, it has been found that it can be beneficial for the operator to use at least some judgement during the testing process, to maintain attention.

Although nearly all, or all, of the tests are automated it has been found that it can be useful to display an indication on the display screen 6 relating to the progress of the tests. The display screen also displays instructions or prompts to the operator and outputs the results of the testing, enabling the operator to mark the set top box under test as having passed or failed or otherwise update records.

As the operator does not need to provide input during a significant part of the testing process, each test station 20 can be used to test two (or more) set top boxes simultaneously. In the example shown in FIG. 2, two set top boxes 10 are being tested simultaneously. In this case a two way splitter is provided that splits data or content streams from the server 18 to each of the set top boxes 10 under test.

The test management software 22 applies a multi-threading approach by using software locks when accessing signals from the measurement hardware. This implements a round-robin approach using back-end multiplexing into the measurement hardware whilst product-embedded routines (for example test routines embedded in the set top boxes) can execute in parallel. The use of multi-threading can result in reduction in the average time spent by an operator testing each set top box unit, lower costs, the use of extended testing techniques (for example, individual tests in a test cycle can last longer if run in parallel without causing an overall increase in test time), and collection of greater amounts of data. In the embodiment of FIG. 1, a single test station can test up to 28 set top box units simultaneously. However, usually only two units are tested simultaneously as that has been found to make the most effective use of operator time.

In contrast to the embodiment of FIG. 1, previously known test systems require significant amounts of user judgement. It is a feature of the embodiment of FIG. 1 that it can be adapted to perform testing of the same or similar criteria as those that that are tested by previously known operator-driven testing systems. For comparison purposes, the embodiment of FIG. 1 was used to test set top boxes in accordance with test criteria defined by the original equipment manufacturer (OEM), following the test procedure outlined in FIG. 3. The same test criteria were applied in an operator-driven testing process.

In the operator driven testing process, the tests are performed and reported in response to prompts from a PC based script, and the various components of the test station are installed on a work bench. Performance parameters are input to the operator where necessary to the PC. The tests include 12 video decision points (for example colour bar, stability of image for each video output), 4 audio decision points, 9 decision points arising from diagnostic pages manually accessed via the set top box user interface, white line test, IR execution test, and front panel LED test. There were 28 decision points per test cycle in total.

In the case of the previously known operator-driven testing process, the video and audio decision points were determined by operator judgement, based upon viewing colour bar test patterns or live or recorded content on a screen, and listening to audio output on headphones. In contrast, in the embodiment of FIG. 1 the video and audio testing is performed automatically, based upon the test sequences described above, resulting in more objective testing and testing for features that cannot be detected easily or at all by an operator.

The results of the manual (operator-driven) and automatic testing of a batch of set top boxes during a fixed time period are summarised in Table 3. The automatic testing was performed on two set top boxes simultaneously.

TABLE 3

|  | Manual | Automated |
|---|---|---|
| Test time (per unit) | 343 seconds | 239 seconds |
| Labour time | 343 seconds | 120 seconds |
| Objective v. subjective | 8% | 95% |
| Number of units tested | 76 | 218 |

It can be seen that due for example to the provision of effective automatic tests of audio/visual quality, the test time per unit is reduced significantly for the automated testing, and the labour time per unit (the time during which the operator is performing an action or otherwise required to pay attention to the testing) is reduced even more significantly. That reduction in labour time means that it is effective to test more than one box simultaneously. The reduction in test time and the testing of two (in this case) units simultaneously means that a far greater number of units (218 compared to 76) were tested in the same time period in this demonstration. In addition, the testing is more objective (95% of the tests are objective, as opposed to 8% for the known testing process).

The testing described in relation to the embodiment of FIG. 1 is performed in a factory or other dedicated test facility. In alternative embodiments, the components of the test system are incorporated into a portable test apparatus 200 that can be transported to a user's premises, for example a user's home, and used to test the set top box in situ. One such alternative embodiment is illustrated in FIG. 15, in which like features are indicated by like reference numerals.

The components of the portable test apparatus 200 are all included in a single housing 208, enabling transport to and from a test location.

Figure 15:
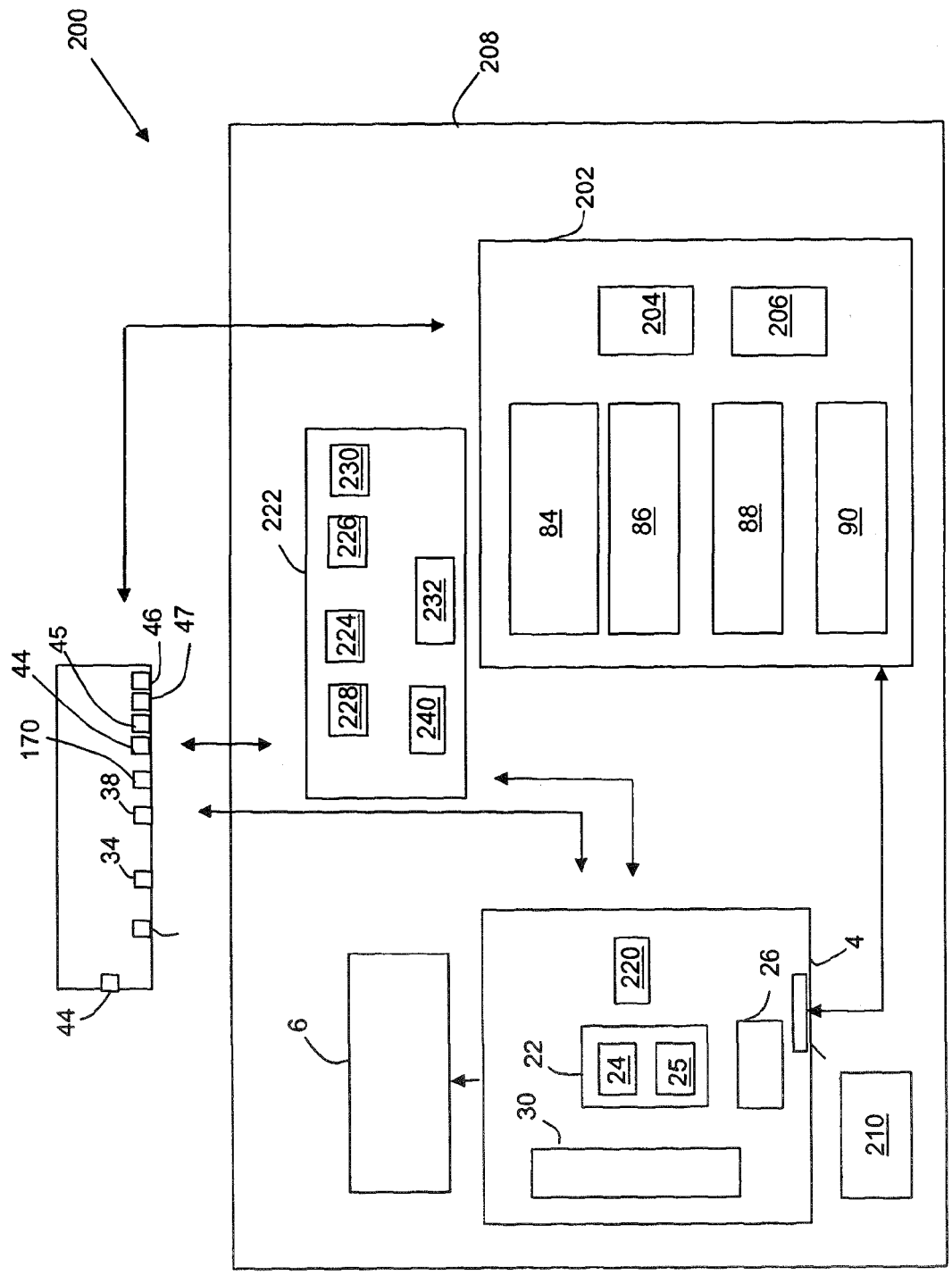
FIG. 15 is a schematic diagram showing a portable test apparatus in an alternative embodiment.

A portable content server 202 is included in the portable apparatus of FIG. 15. The portable content server includes a storage device 204 in the form of hard disk, which stores test content including for example the test sequences described in relation to FIGS. 4, 6 and 9 and a control processor 206. The portable content server 202 includes various stream delivery components, including one or more playout cards 86, 88, 90 for one or more different delivery stream and audio/visual content formats, for example DVB-C, DVB S/S2, IPTV, and HDTV. The portable content server can also include a cable modem termination system 84 and a combiner for combining output from one or more of the stream players and the CMTS before outputting from the portable apparatus to the set top box under test.

The system of FIG. 15, includes a video capture card 220 that can capture both SD and HD video (for example a Black Magic Design Intensity Pro capture card or any other suitable card for example an SD/HD acquisition card that has a C or C++SDK) in place of the separate SD and HD capture cards used in the embodiment of FIG. 1. The card has a number of SD & HD input and output connections, and in the example of FIG. 15, the composite video and phono left and right inputs are used for SD capture, and the HDMI input is used for HD capture.

The components that are included in the portable test apparatus can be selected in dependence on the video standard used by the set top boxes or other apparatus that are intended to be tested by the apparatus. Table 4 provides examples of components that may be included or omitted depending on whether the apparatus is intended for testing set top boxes that use the DVB C, DVB S/S2 or IPTV standards.

TABLE 4

|  | CMTS | DVB-C Stream player | DVB-S/S2 stream player | Panel PC (4) With audio/ video card (200) | Hardware Interface (222) |
|---|---|---|---|---|---|
| DVB-C | Yes | Yes | No | Yes | Yes |
| DVB-S/S2 | No | No | Yes | Yes | Yes |
| IPTV | No | No | No | Yes | Yes |

The image acquisition software has two modes of capture, single shot and real time, which allow a single frame of data to be captured on a given input, or a stream to be captured in real time on the given input.

In one mode of operation, the single shot mode is selected for analogue signal outputs from the set top box under test (TV scart, VCR scart, SVHS, component and CVBS Phono). Thus, the frame identifier tests are again not performed for those outputs, although they could be if the real time mode was chosen.

The real time mode is used for the HDMI output from the set top box. As the measured HD data is baseband, and as there is no analogue variation, the measurement data and algorithm are particularly robust.

A separate interface device 8 is not provided in the embodiment of FIG. 15. Instead an internal hardware interface 222 is provided that provides the same or similar functionality. The hardware interface 222 includes a video decoder/encoder and multiplexer 224 (for example comprising a Texas Instruments TVP5146, and Analog devices ADV7393), a bank of analog switches 226 (for example comprising Texas Instruments TS5A23166 & TS5A3159) to provide audio multiplexing, a microcontroller 228 (for example a Microchip DSPIC33FJ256GP506), an r.f generator 230 (for example comprising a Freescale MC44CC373 device), and an HDMI switch 232 (for example based upon a Texas Instruments TMDS351).

The interface 222 is operable to multiplex video and audio inputs from the set top box or other apparatus under test into the SD or HD inputs of the video capture card. The UHF is still captured using DX9 routines into that stream the UHF input into an avi file for subsequent testing. In the embodiment of FIG. 15, the TV Tuner card is replaced by a USB TV tuner device 240 (for example a Mygica hybrid TV stick), but any tuner device that supports use of Microsoft DX9 technology can be used in this embodiment.

Figure 16:
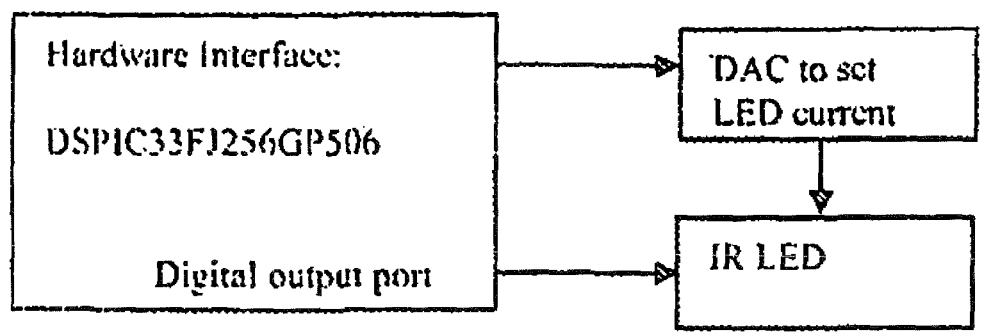
FIG. 16 is a schematic illustration of components of the embodiment of FIG. 15 used in the testing of an infra-red receiver.

In the case of the IR tests, the IR emulator device 12 is controlled in a similar but different fashion to the way it is controlled in the embodiment of FIG. 1. Button scan codes from either the RC5 or RC6 control protocol are sent to the Microchip DISPIC33FJ256GP506 microcontroller device 228 where they are translated into IR send signals by firmware of the microcontroller device 228. The signals are sent to the IR LED 180. A control signal setting the amplitude of the IR output signals is sent from the microcontroller 228 via a digital analogue converter to the IR LED 180 to set the LED current, as illustrated schematically in FIG. 16.

The internal interface 222 includes the following functionality:

1. routing of video on TV scart, VCR scart, SVHS, component, CVBS Phone to the SD input of the audio/video capture card 220.

2. routing of audio on TV scart, VCR scart, Phono L & R, SPDIF to SD input of audio/video capture card 220.

3. routing of HD to the HD input of the audio/video capture card 220.

4. providing of colour bar input signal to VCR input signals.

5. providing audio tone input signal to VCR input signals.

6. providing UHF colour bar signal to antenna connection for loop through test.

The interface 222 connects to the PC 4 via a serial port, and the microcontroller 228 controls all hardware functions of the interface 222. The USB PC Tuner device 240 is provided to provide physical routing of signals from the set top box or other apparatus under test.

Figure 17:
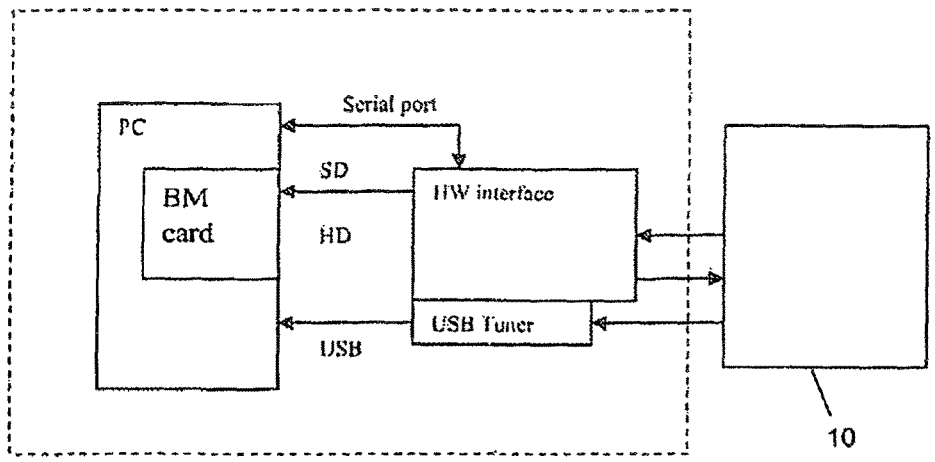
FIG. 17 is a schematic diagram illustrating the capture of audio/visual data by the embodiment of FIG. 15.
Figure 18:
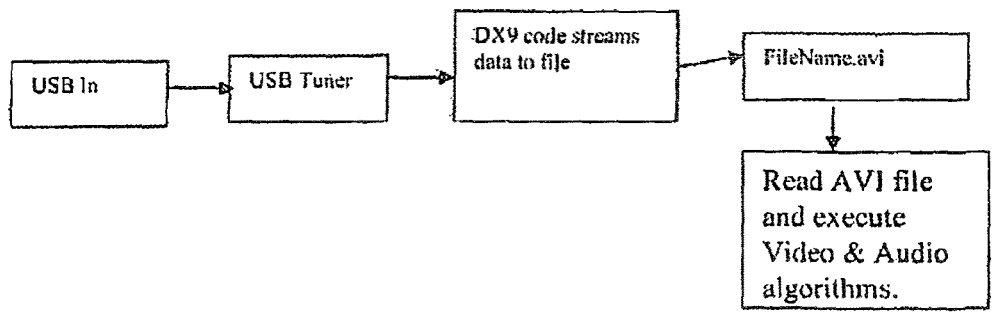
FIGS. 18 and 19 are further schematic diagrams illustrating the receipt and processing of audio/visual data.
Figure 19:
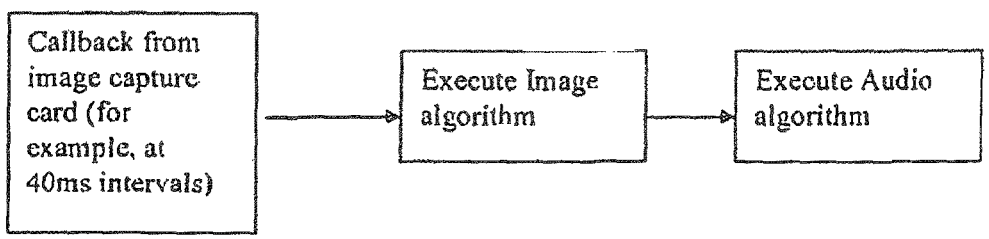

In this embodiment, only two devices capture AV signals, namely the Tuner 240 and the SD/HD capture card 220, as illustrated schematically in FIG. 17. FIGS. 18 and 19 show schematically a sequence of actions that can occur in the receipt and processing of video and audio data for UHF and HD inputs for the embodiment of FIG. 15.

In operation, a set top box usually decodes a received stream to build up a complete and entire image frame, which is then written into a frame buffer of the set top box.

The output circuitry of the set top box continuously reads the output frame buffer and produces output signals on the selected or default connector for delivery to a viewer's television (or test apparatus in the case of the systems of FIGS. 1 and 15). If the set top box decoder trips up decoding the received stream, or if other faults occur, the set top box will still output a signal, but it will be the last data that was written into the frame buffer, and will usually show up as a frame freeze effect. There is usually no buffering of audio output by the set top box, and dropped audio content results in loss of audio output.

Figure 20:
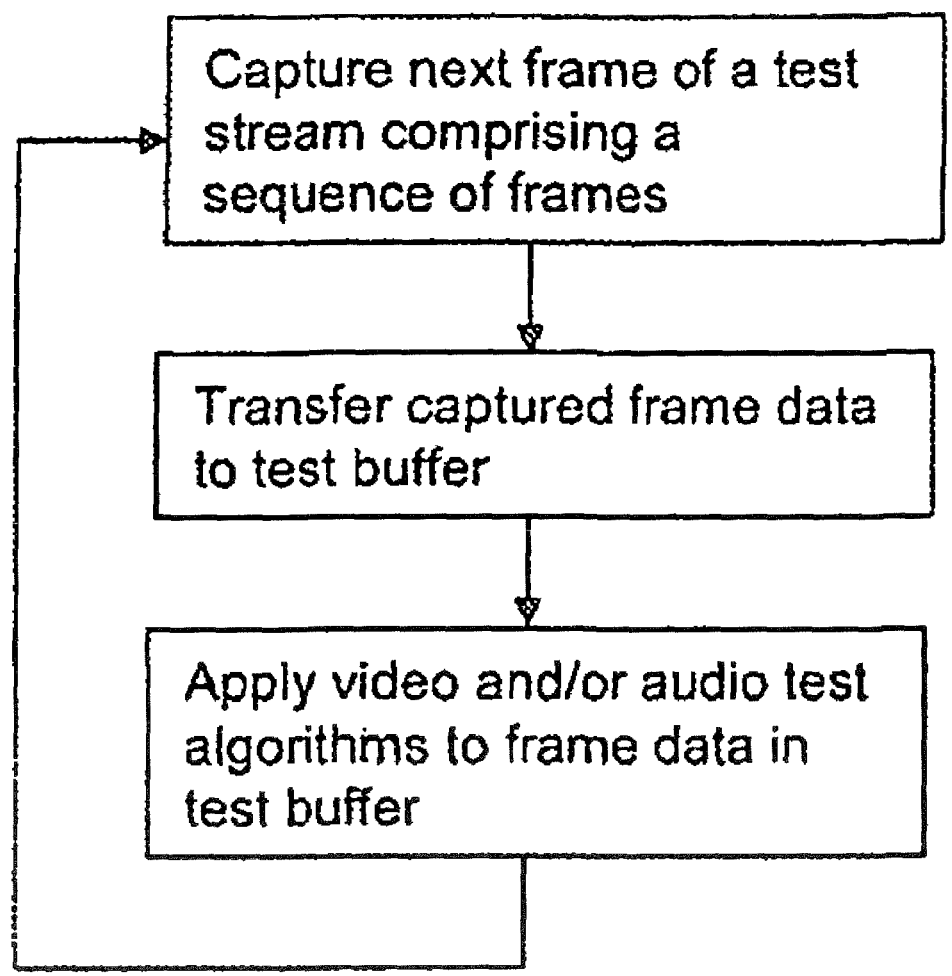
FIG. 20 is a flow chart illustrating in overview a frame-by-frame testing process.

In the embodiment of FIG. 15, the acquisition card 220 captures successive single frames of data in turn, and delivers them one at a time into a software buffer. At the same time the video and audio processing algorithms applied by the software 22 (for example applying the various video and audio tests) then process each frame in the buffer in turn. Thus, the testing of video and audio outputs for one part of the stream can proceed whilst the set top box is processing, or has yet to receive, later parts of the stream. That process is illustrated schematically in overview in the flow chart of FIG. 20.

In the case of processing an AVI file, the frames are selected sequentially using a software routine and processed accordingly.

The embodiment of FIG. 15 can provide a condensed configuration in comparison to the embodiment of FIG. 1. For example, a separate oscilloscope device is not required as all audio signals are routed into the SD/HD capture card 220, a separate colour bar generator device is not required as the internal hardware interface 222 includes a colour car generator, tone generator, and RF modulator to supply VCR & UHF reference signals, and a separate IR emulator controller is not required as the required control signals can be generated by the interface microcontroller 228.

The test management software of the embodiment of FIG. 15, is operable to ignore any stream roll over period during that occurs between repetitions of a test stream, to allow extended period testing to take place. In known testing arrangements, a test stream that is played out is read from file, this file is looped indefinitely, and when rollover occurs, the set top box looses sync with the stream for a few seconds then sync's back on to it, the rollover causes a frame freeze and audio drop out. By ignoring this known symptom, the embodiment of FIG. 15 can monitor a set top box or other apparatus under test for as long as desired For example, a 135 second test stream has been tested over a 24 hour period using the embodiment of FIG. 15. The stream was successfully monitored in real time for 23 hours 35 minutes of the testing period without a frame drop, and the system ignored 25 minutes (just over 2 million frames) of audio/video input due to roll over.

In general test streams are time limited due to the file size needed for their storage. For example, the 135 second stream of the preceding paragraph required a file of size 648 Mb, which just fits onto a standard data CD. Different length streams can be used if necessary, and the number of identifier digits in the frame identifiers has been increased from 4 to 5 in some embodiments (see for example FIG. 4) to allow greater length streams to be used in the future. By increasing the length of the stream, rollover occurrences can be reduced in extended testing.

In operation of the embodiment of FIG. 15, a set top box to be tested in situ is disconnected from cable, telephone line or other input connections via which it receives content and is instead connected to the portable test apparatus via appropriate cabling (cable, telephone line or other network cable). Outputs from the set top box under test are also disconnected (for instance disconnected from a TV, VCR or other user electronic equipment) and connected to the set top box test apparatus via appropriate cables (for example Scut or r.f. cables).

Once connected the set top box is tested automatically by the portable test apparatus, following one or more test procedures that are the same as or similar to those described above.

The portable test apparatus includes a GSM/GPRS module 210 and associated antenna that is operable to transmit results of the tests to a remote server, where the results can be stored and processed.

As test content is streamed from the portable content server, the testing of the set top box can be performed independently of the performance of the network or other delivery mechanism for delivering content to a user in normal use. In many cases, problems experienced by a user may be due to network or other content delivery mechanism performance and erroneously attributed to the set top box. The portable test apparatus can test set top box performance in isolation from such factors. In variants of the embodiment of FIG. 15, the portable set top box test apparatus also includes a network test device, and as well as testing the set top box the network test device can be connected to the user's network or other content delivery mechanism for testing performance of the network or other delivery mechanism. The network testing can be performed using known techniques.

By testing set top boxes in situ the portable test apparatus of FIG. 15 can also avoid unnecessary transportation of the set top boxes to a central test facility. Such transportation can cause damage to set top boxes, and may cause set top boxes to fail tests that they would have passed if left in situ. The automated nature of the testing also means that the testing, particularly the testing of audio/visual processing can be performed in situ without requiring a significant level of operator input. Thus, the testing can be performed by, for example, operators of a service provider rather than operators of an OEM or a dedicated testing facility.

The embodiments of FIGS. 1 and 15 have been described in relation to the testing of set top boxes. However, it will be understood that the embodiments or aspects of the embodiments can also be used to test other electronic equipment, including audio/visual equipment, for example VCRs, video cameras, personal computer and devices equipped with video processing functionality, for example mobile phones. It will be understood that aspects of the embodiments relating to the testing of an infra-red receiver can be used to test any suitable device including an infra-red receiver, for example a television, audio system or VCR.

Different examples of system components have been described in relation to the embodiments of FIGS. 1 and 15. It will be understood that the various system components can be provided in any suitable combination, and components can be omitted or added depending on the desired functionality of the system. The embodiment of FIG. 1 can be implemented as a portable apparatus, and the embodiment of FIG. 15 can be implemented as a fixed apparatus, for example in a test facility, if desired.

Embodiments relating to video testing using test patterns or sequences are not limited to the use of test patterns or sequences described in relation to FIGS. 4, 6 and 9. For example, the colour bars can of any suitable shape and number, and the regions of interest for which pixel signals or other video output signals are analysed may also be of any suitable shape. Furthermore, in certain embodiments, not every pixel signal or other video output signal is selected for analysis. For example, in some embodiments pixel signals within the region of interest are alternately selected and not selected for analysis, or a number of pixels are selected for analysis at random from within region of interest. That can reduce the processing load whilst at the same time ensuring that signals from across the region of interest are analysed.

The frame identifiers are not limited to comprising a sequence of numbers, and any suitable frame identifier can be used, including any alphanumeric characters or other shapes.

Whilst components of the embodiments described herein have been implemented in software, it will be understood that any such components can be implemented in hardware or a combination of hardware, for example in the form of ASICs or FPGAs. Similarly some or all of the hardware components of embodiments described herein may be implemented in software or in a suitable combination of software and hardware.

Alternative embodiments of the invention or aspects of such embodiments can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will be understood that the present invention has been described above purely by way of example, and modifications of detail can be made within the scope of the invention. Each feature disclosed in the description, and (where appropriate) the claims and drawings may be provided independently or in any appropriate combination.

The invention claimed is:

1. A test apparatus for testing a set top box, comprising:
a controller operable to control the apparatus to apply an automated test procedure to the set top box;
a memory for storing at least one video input test signal, wherein the controller is configured to control the apparatus to provide the at least one video input test signal from the memory to the set top box;
a receiver for receiving from the set top box at least one video output provided by the set top box in response to the at least one video input test signal; and
a processor for determining automatically the outcome of at least one test of the test procedure in dependence on the at least one video output,
wherein for at least one of the tests, the processor is configured to repeatedly determine during the test whether the set top box has failed the test, and to terminate the test prior to complete receipt and processing of the at least one video input test signal if the test is failed mid-stream.

2. The apparatus according to claim 1, wherein:
the at least one video input test signal is representative of a test sequence, the test sequence comprising a sequence of frames, each frame comprising an image of a respective different one of a plurality of frame identifiers;
the processor is configured to obtain a sequence of sets of frame data by processing the video output, each set of frame data representative of a respective frame; and
the processor is further operable to process each set of frame data to determine a frame identifier for that frame.

3. The apparatus according to claim 2, wherein the processor is operable to compare at least some of frame identifiers determined by the processor from the video output to stored frame identifiers for the test sequence, and to determine from the comparison whether the video output represents the sequence of frames correctly.

4. The apparatus according to claim 3, wherein the processor is operable to determine from the comparison whether there is at least one of a missing frame or a freeze frame error.

5. The apparatus according to claim 2, wherein:
the image of the frame identifier for each frame is located in an identifier region of the frame;
the processor is configured to process, for each frame, the video output to obtain a plurality of display signals from the video output, each display signal representative of the video output for a respective location on the frame;
the processor is further configured to select those display signals representative of the video output at locations in the identifier region of the frame, and to determine the frame identifier from the selected display signals.

6. The apparatus according to claim 5, wherein each frame comprises at least one alignment mark located at a predetermined position with respect to the identifier region, and the processor is configured to process the video output, for each frame, to determine the location of the at least one alignment mark for the frame and to determine the location of the identifier region from the determined location of the at least one alignment mark.

7. The apparatus according to claim 2, wherein the processor is configured to test at least one of the sets of frame data obtained by the processor from the video output before completion of the receiving or processing of the video output to obtain further sets of frame data representative of later frames in the sequence.

8. The apparatus according to claim 2, wherein the processor is configured to determine whether the set top box has passed or failed based on said testing of at least one of the sets of frame data, before completion of the receiving and/or processing of the video output to obtain further sets of frame data representative of later frames in the sequence.

9. The apparatus according to claim 1, further comprising:
an infra-red test device for outputting an infra-red test signal to an infra-red detector of the set top box.

10. The apparatus according to claim 9, wherein the infra-red test device is configured to emulate operation of a remote control unit that is intended for use with the set top box.

11. The apparatus according to claim 9, wherein the controller is configured to control the magnitude of the infra-red test signal to be substantially less than the magnitude of an infra-red signal output from a remote control unit that is intended for use with the set top box in normal operation.

12. The apparatus according to claim 9, further comprising a mount for mounting the infra-red test device at a desired distance from the infra-red detector of the set top box.

13. The apparatus according to claim 12, wherein the controller is configured to control the magnitude of the infra-red test signal output by the infra-red test device when the infra-red rest device is mounted on said mount at the desired distance, such that the magnitude of the infra-red signal received at the infra-red detector of the set top box is substantially equal to at least one of:
  a) a signal magnitude expected to be obtained from a remote control unit at a pre-determined distance of between 2 m and 5 m from the remote control unit in normal operation;
  b) a threshold minimum acceptable level to which the infra-red detector is expected to be responsive;
  c) a signal magnitude expected to be obtained from a remote control unit at full battery power; or
  d) a signal magnitude expected to be obtained from a remote control unit at a threshold minimum acceptable battery power.

14. The apparatus according to claim 1, wherein:
the at least one video input signal is representative of a test pattern comprising a plurality of colour bars;
the processor is configured to process the video output to obtain a plurality of display signals, each display signal representative of the video output for a respective location;
the processor is further configured to select, for at least one of the colour bars, a region of interest within that colour bar and to select a plurality of the display signals representative of the video output at locations within the region of interest; and
the processor is further configured to process the selected display signals to determine whether the video output represents the colour bar correctly.

15. The apparatus according to claim 14, wherein the region of interest is selected to extend for a plurality of pixels in both horizontal and vertical display directions.

16. The apparatus according to claim 14, wherein the region of interest for a colour bar is selected to exclude a border region of the colour bar.

17. The apparatus according to claim 14, wherein the processing of the selected display signals by the processor comprises determining, for each of the locations, at least one numerical value representative of the colour at that location, comparing at least one of an average or spread of the determined values to an expected value, and determining that the video output does not represent the colour bar correctly if said average or spread is different from the expected value by greater than a threshold amount.

18. A method of testing a set top box, comprising:
providing at least one video input test signal to the set top box;
receiving from the set top box at least one video output provided by the video set top box in response to the at least one video input test signal;
processing the video output and automatically determining the outcome of at least one test of an automated test sequence in dependence on the at least one video output;
repeatedly determining during the test whether the set top box has failed the test;
terminating the test prior to complete receipt; and
processing of the at least one video input test signal if the test is failed mid-stream.

* * * * *